United States Patent
Moon et al.

(10) Patent No.: US 10,048,892 B2
(45) Date of Patent: Aug. 14, 2018

(54) METHODS OF DETECTING FAST REUSE MEMORY BLOCKS AND MEMORY BLOCK MANAGEMENT METHODS USING THE SAME

(71) Applicant: Samsung Electronics Co., Ltd., Suwon-si, Gyeonggi-do (KR)

(72) Inventors: Sang-kwon Moon, Osan-si (KR); Jong-youl Lee, Seoul (KR); Seong-jun Ahn, Seoul (KR); Hee-won Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/429,496

(22) Filed: Feb. 10, 2017

(65) Prior Publication Data

US 2017/0351459 A1    Dec. 7, 2017

(30) Foreign Application Priority Data

Jun. 1, 2016    (KR) .......................... 10-2016-0068109

(51) Int. Cl.
   *G06F 3/06*    (2006.01)
(52) U.S. Cl.
   CPC ............ *G06F 3/0652* (2013.01); *G06F 3/064* (2013.01); *G06F 3/0608* (2013.01); *G06F 3/0679* (2013.01)
(58) Field of Classification Search
   CPC .... G06F 3/0652; G06F 3/0679; G06F 3/0608; G06F 3/064
   See application file for complete search history.

(56) References Cited

U.S. PATENT DOCUMENTS

| | | | |
|---|---|---|---|
| 7,032,087 B1 | 4/2006 | Chang et al. | |
| 8,082,386 B2 | 12/2011 | Kao et al. | |
| 8,447,915 B2 | 5/2013 | Araki et al. | |
| 8,583,856 B2 | 11/2013 | Yao | |
| 8,762,622 B2 | 6/2014 | Moshayedi et al. | |
| 8,825,941 B2 | 9/2014 | Moshayedi et al. | |
| 8,832,506 B2 | 9/2014 | Griffin et al. | |
| 8,995,197 B1 | 3/2015 | Steiner et al. | |
| 2011/0271030 A1* | 11/2011 | Iaculo | G11C 16/349 711/102 |
| 2012/0191927 A1 | 6/2012 | Gorobets et al. | |
| 2013/0051144 A1* | 2/2013 | Suzuki | G06F 3/0616 365/185.11 |
| 2014/0059405 A1* | 2/2014 | Syu | G11C 16/349 714/773 |
| 2015/0067239 A1 | 3/2015 | Chu et al. | |
| 2015/0179254 A1* | 6/2015 | Alrod | G11C 13/0033 365/148 |
| 2015/0186072 A1 | 7/2015 | Darragh et al. | |

* cited by examiner

*Primary Examiner* — Ajay Ojha
(74) *Attorney, Agent, or Firm* — Myers Bigel, P.A.

(57) ABSTRACT

Fast reuse memory block detection methods and memory block management methods using the same are provided. A fast reuse memory block detection method may include selecting a memory block from memory blocks included in a nonvolatile memory device as a reference block at an initially set period, managing one of an erase time and a program time of the reference block, and determining whether other memory blocks are fast reuse memory blocks, based on a use period that is determined according to the managed one of the erase time and the program time of the reference block.

19 Claims, 33 Drawing Sheets

FIG. 11C

| Mark Table | | |
|---|---|---|
| Block Address | Erase Time | NOF |
| 5 (Block E) | 905 | 1 |

| Mark Table ||| T1
|---|---|---|
| Block Address | Erase Time | NOF |
| 5 (Block E) | 900 | 0 |

FIG. 13C

| FRB Table ||
|---|---|
| Block Address | NOF |
| 5 (Block E) | 4 |
| 1 (Block A) | 4 |
| 2 (Block B) | 4 |
| 3 (Block C) | 4 |
| 4 (Block D) | 4 |

| Mark Table |||| T1 |
|---|---|---|---|
| Block Address | Erase Time | NOF | Mark Period |
| 5 (Block E) | 900 | 0 | 10 SECONDS |
| 8 | 850 | 0 | 100 SECONDS |
| 100 | 800 | 0 | 500 SECONDS |
| 120 | 500 | 0 | 1000 SECONDS |

METHODS OF DETECTING FAST REUSE MEMORY BLOCKS AND MEMORY BLOCK MANAGEMENT METHODS USING THE SAME

CROSS-REFERENCE TO RELATED APPLICATION

This U.S. non-provisional patent application claims priority under 35 U.S.C. § 119 to Korean Patent Application No. 10-2016-0068109, filed on Jun. 1, 2016, in the Korean Intellectual Property Office, the disclosure of which is incorporated herein in its entirety by reference.

BACKGROUND

Embodiments of the inventive concepts relate to firmware architectures and operations of storage devices, and more particularly, to fast reuse memory block detection methods and memory block management methods using the same.

Non-volatile memory devices, for example, flash memory devices may be selected as a storage device due to fast processing speed and/or low power consumption. Memory blocks of the storage device may be characterized in that the reliability thereof may vary according to an erase and/or program cycle. In particular, the reliability of a memory block, at which an erase and/or program operation is repeatedly performed at a short period, may be lowered.

SUMMARY

According to some embodiments of the inventive concepts, methods of detecting fast reuse memory blocks by using few resources may be provided.

According to some embodiments of the inventive concepts, methods of managing fast reuse memory blocks by using few resources may be provided.

According to some embodiments of the inventive concepts, fast reuse memory block detection methods may be provided. A method may include selecting a memory block from memory blocks included in a nonvolatile memory device as a reference block at an initially set period, managing one of an erase time and a program time of the reference block, and determining whether other memory blocks are fast reuse memory blocks, based on a use period that is determined according to the managed one of the erase time and the program time of the reference block.

According to some embodiments of the inventive concepts, memory block management methods may be provided. A method may include detecting fast reuse memory blocks, in each of which one of an erase cycle and a program cycle is less than or equal to an initially set first threshold value, from among a plurality of memory blocks included in a nonvolatile memory device, determining a memory block, of which a fast reuse count is greater than or equal to an initially set second threshold value, from among the detected fast reuse memory blocks as a wear leveling block, and performing wear leveling processing with respect to the wear leveling block.

According to some embodiments of the inventive concepts, memory block management methods may be provided. A method may include selecting a memory block, from among memory blocks included in a nonvolatile memory device, as a reference block. The method may include increasing a fast reuse count of the selected reference block based on a determination that a use period of the selected reference block is less than a first threshold. The use period may be a time between adjacent erase or program operations that are performed on the selected reference block. The method may include setting a fast reuse count that is equal to the increased fast reuse count of the selected reference block for active memory blocks that are used within the use period of the selected reference block. The method may include performing wear leveling processing on one or more of the memory blocks based on a determination that a respective fast reuse count of the one or more of the memory blocks is greater than a second threshold.

BRIEF DESCRIPTION OF THE DRAWINGS

Embodiments of the inventive concepts may be more clearly understood from the following detailed description taken in conjunction with the accompanying drawings in which:

FIGS. 11A to 11C are views illustrating a mark table management operation that is performed according to a fast reuse memory block detection method of the memory system of FIG. 1 or 2 according to some embodiments of the inventive concepts;

FIGS. 12A to 12C are views illustrating a mark table management operation that is performed according to a fast reuse memory block detection method of the memory system of FIG. 1 or 2 according to some embodiments of the inventive concepts;

FIGS. 13A to 13C are views illustrating a mark table and a fast reuse block table that are managed according to a fast reuse memory block detection method of the memory system of FIG. 1 or 2 according to some embodiments of the inventive concepts;

FIGS. 15A and 15B are views illustrating a mark table management operation that is performed according to a fast reuse memory block detection method of the memory system of FIG. 1 or 2 according to some embodiments of the inventive concepts;

DETAILED DESCRIPTION

As used herein, the term "and/or" includes any and all combinations of one or more of the associated listed items. Expressions such as "at least one of", when preceding a list of elements, modify the entire list of elements and do not modify the individual elements of the list.

Figure 1:
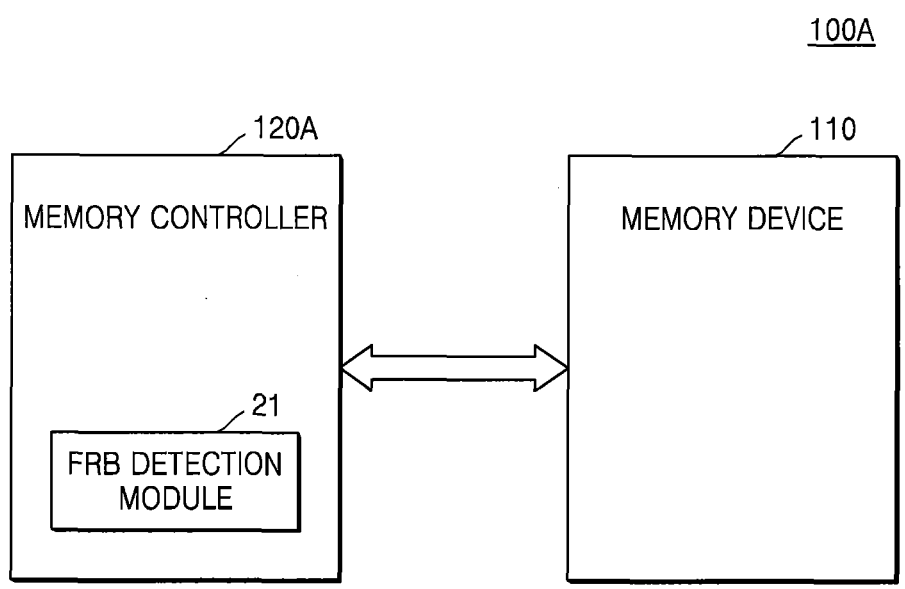
FIG. 1 is a schematic block diagram illustrating a configuration of a memory system according to some embodiments of the inventive concepts.

FIG. 1 is a schematic block diagram illustrating a configuration of a memory system according to some embodiments of the inventive concepts.

Referring to FIG. 1, a memory system 100A may include a memory device 110 and a memory controller 120A.

The memory device 110 may be implemented with a non-volatile memory device. For example, the memory device 110 may be a flash memory device, a phase change random access memory (PRAM), a ferroelectric RAM (FRAM), a magnetic RAM (MRAM), etc. The memory device 110 may be implemented in a form where at least one non-volatile memory device and at least one volatile memory device are combined or in a form where at least two or more kinds of non-volatile memory devices are combined.

For example, the memory device 110 may be implemented with a single memory chip. As another example, the memory device 110 may be implemented with a plurality of memory chips. One memory chip may be implemented with a single die or a plurality of dies. One die may include a single plane or a plurality of planes. One plane may include a plurality of memory blocks, each of which may include a plurality of pages. Each page may include a plurality of sectors.

The reliability of the memory device 110 may vary according to a cycle time from a point in time when erase and program operations are performed on one memory block to a point in time when the erase and program operations are again performed on the memory block. For example, the reliability of a memory block in the flash memory device, at which the erase and program operations are repeatedly performed at a very short cycle, may be lowered.

Detecting fast reuse memory blocks may reduce or prevent the fast reuse of the memory blocks. Some embodiments of the inventive concepts provide a method of detecting the fast reuse memory blocks by using few resources. For example, the memory controller 120A may perform an operation of detecting fast reuse memory blocks by using few resources.

The memory controller 120A may control the memory device 110. For example, the memory controller 120A may generate an address ADDR, a command CMD, and/or a control signal CTRL, which may be used to control the memory device 110. The memory controller 120A may control program (or write), read, and/or erase operations of the memory device 110 by providing the memory device 110 with the address ADDR, the command CMD, and/or the control signal CTRL.

The memory controller 120A may include a fast reuse memory block (FRB) detection module 21.

The FRB detection module 21 may select, as a reference block, a memory block in the memory device 110 at an initially set period and may manage an erase time and/or a program time of the selected reference block. The FRB detection module 21 may determine whether other memory blocks are fast reuse memory blocks, based on a use period that is determined according to the erase and/or program time of the reference block. For example, the FRB detection module 21 may be implemented with hardware or by software.

For example, the FRB detection module 21 may select the reference block from memory blocks, which are may be respectively changed into active blocks, from among memory blocks included in a free block list at the initially set period.

For example, the memory blocks in the free block list may be memory blocks that include pieces of invalid data that are stored in programmable pages. The memory blocks may not include programmable empty pages. That is, valid data may not be stored in the memory blocks included in the free block list. As used herein, an active block may refer to a memory block that includes an empty page capable of storing data. As such, if a memory block in the free block list is selected as an active block, the erase operation may be performed on the memory block that is selected as the active block to perform the program operation.

For example, the FRB detection module 21 may randomly select some of the memory blocks in the free block list, make a transition from the selected memory blocks to the active blocks, and select the reference block from the memory blocks transitioning to the active blocks at the initially set period. As another example, the FRB detection module 21 may make a transition from the memory blocks in the free block list to the active blocks based on the order of memory blocks registered in the free block list as a free block and select the reference block from the memory blocks transitioning to the active blocks at the initially set period.

For example, the FRB detection module 21 may determine whether memory blocks, which are used as the active blocks during an erase interval of the reference block, are fast reuse memory blocks, based on the use period of the reference block. In detail, in the case where an erase cycle of the reference block determined according to a measured erase time is less than or equal to an initially set first threshold value TH1, the reference block may be determined as a fast reuse memory block, and memory blocks, which are used as the active blocks during a section where the reference block is detected as the fast reuse memory block, may be registered as fast reuse memory blocks.

As another example, the FRB detection module 21 may determine whether memory blocks that are used as the active blocks during a program cycle of an initially set reference page in the reference block are fast reuse memory blocks based on the use period of the reference block.

Figure 2:
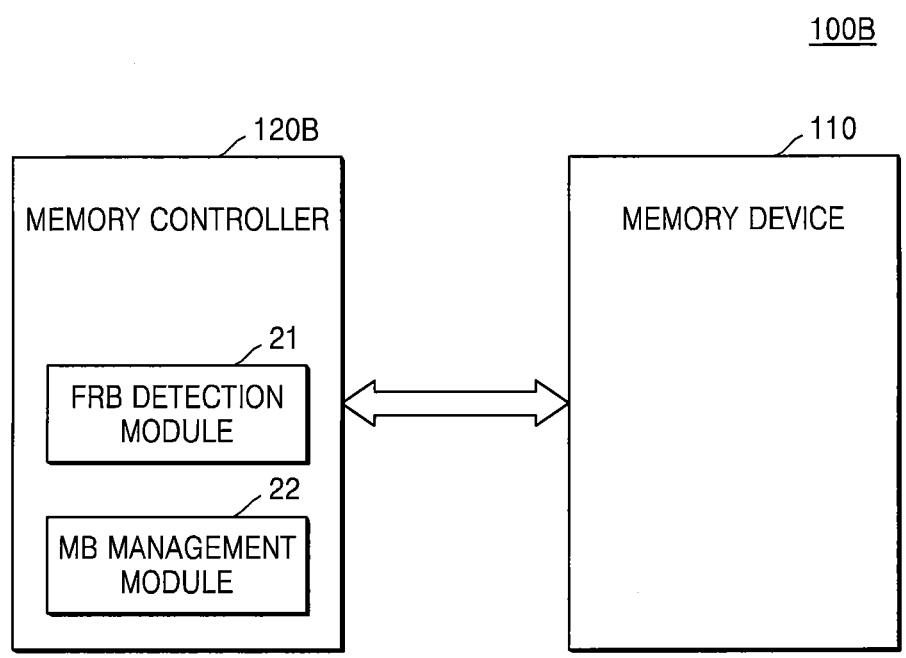
FIG. 2 is a schematic block diagram illustrating a configuration of a memory system according to some embodiments of the inventive concepts.

FIG. 2 is a schematic block diagram illustrating a configuration of a memory system according to some embodiments of the inventive concepts.

Referring to FIG. 2, a memory system 100B may include the memory device 110 and a memory controller 120B.

The memory device 110 is described with reference to FIG. 1, and thus, a complete description thereof may not be repeated here. A basic operation of the memory controller 120B and an operation of the FRB detection module 21 are already described with reference to FIG. 1, and thus, a complete description thereof may not be repeated here.

The memory system 100B of FIG. 2 is different from the memory system 100A of FIG. 1 in that the memory controller 120B may further include a memory block (MB) management module 22.

The MB management module 22 may determine a memory block, of which a fast reuse count exceeds an initially set second threshold value TH2, from among fast reuse memory blocks detected by the FRB detection module 21, as a wear leveling block and may perform wear leveling processing on the determined wear leveling block. For example, the MB management module 22 may be implemented with hardware or by software. For example, the wear leveling processing may include an operation of copying data of a memory block, of which an update count is less than a reference value, from among memory blocks in a data block list, to the memory block determined as the wear leveling block. Here, the memory blocks in the data block list may not include a programmable page, and may include valid data is stored in at least one page. In some embodiments, the update count may be a counter that represents a number of times that the memory block has been updated. In some embodiments, the update count may be a counter that represents a number of times that the memory block has been recently updated. In other words, a memory block that has an update count that is less than the reference value may indicate that the data that is stored in this memory block is less likely to be updated than other memory blocks with higher update counts. After copying data from a memory block with a lower update count to the wear leveling block, the wear leveling block may be less likely to be a fast reuse memory block.

Figure 3:
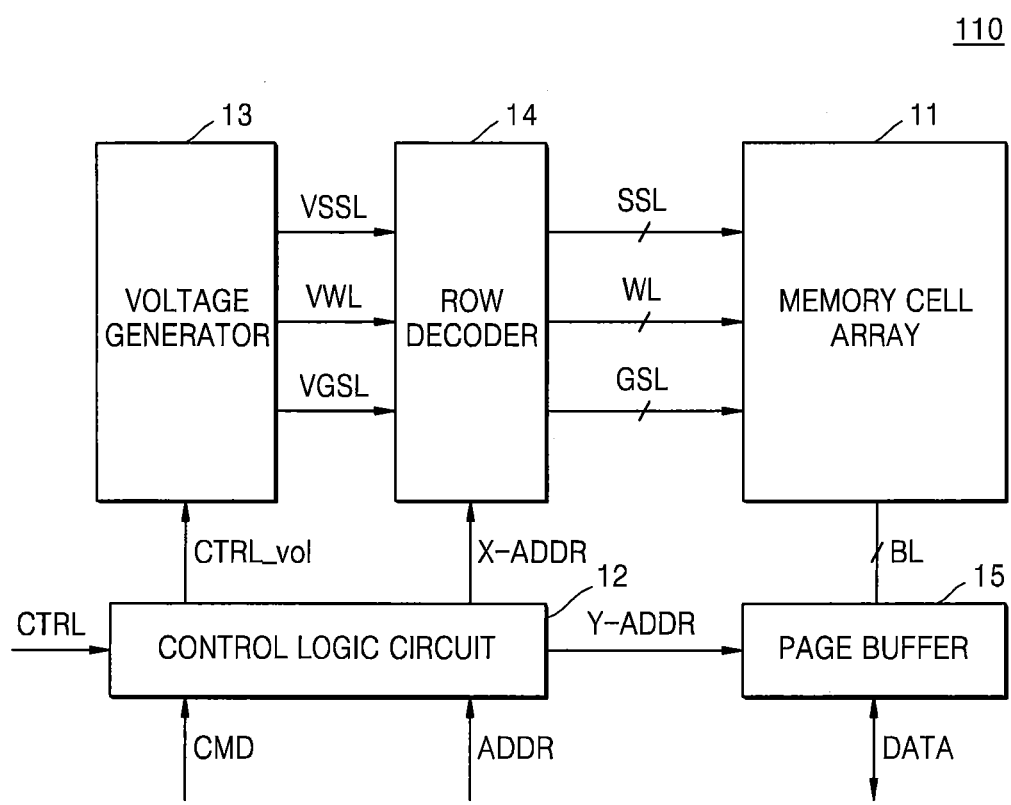
FIG. 3 is a schematic block diagram illustrating a configuration of the memory device of FIGS. 1 and 2 according to some embodiments of the inventive concepts.

FIG. 3 is a schematic block diagram illustrating a configuration of the memory device of FIGS. 1 and 2 according to some embodiments of the inventive concepts.

Referring to FIG. 3, a memory device 110 may include a memory cell array 11, a control logic circuit 12, a voltage generator 13, a row decoder 14, and a page buffer 15.

The memory cell array 11 may include a plurality of memory cells that are respectively arranged at intersections of a plurality of word lines and a plurality of bit lines. In some embodiments, the memory cells may be flash memory cells. For example, the memory cell array 11 may be a NAND flash memory cell array and/or a NOR flash memory cell array. Below, some embodiments will be more fully described under the assumption that the memory cells are NAND flash memory cells. However, it will be understood that, in some embodiments, memory cells may be NOR flash memory cells.

The memory cell array 11 may have a string structure in which a plurality of memory cells are serially connected to each other. For example, in a cell string, a ground selection transistor, one or more dummy memory cells, a plurality of main memory cells, and a string selection transistor may be connected in series between a common source line CSL and a bit line BL. To reduce coupling influence of the common source line CSL on the main memory cells, the dummy memory cell may be arranged between the ground selection transistor and the main memory cells. That is, the dummy memory cell may be arranged at one edge of the main memory cells. The main and dummy memory cells, which may be connected to a plurality of bit lines, may be respectively connected to different word lines. For example, a word line, to which the dummy memory cells are connected, may be referred to as a "dummy word line".

To minimize back pattern dependency being a drawback of the cell string structure, in a cell string, program operations may be sequentially performed from a memory cell that is the closest to the ground selection transistor to which a global source line GSL is connected. Here, the global source line GSL may be referred to as a "ground selection line".

For example, the memory cell array 11 may be designed to have a two-dimensional planar NAND flash memory cell structure. As another example, the memory cell array 11 may be designed to have a three-dimensional (3D) vertical NAND flash memory cell structure.

In some embodiments, the 3D memory cell array 11 may be monolithically formed in one or more physical levels of arrays of memory cells having an active area above a silicon substrate and circuitry associated with the operation of the memory cells. The associated circuitry may be above or within the silicon substrate. As used herein, the term "monolithic" may mean that layers of each level of the 3D memory cell array are directly deposited on layers of each underlying level of the 3D memory cell array.

In some embodiments, the 3D memory cell array may include NAND strings that are vertically oriented such that at least one memory cell is located over another memory cell. The at least one memory cell may include a charge trap layer.

The following patent documents, which are hereby incorporated by reference, disclose suitable configurations for 3D memory arrays, in which the 3D memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

A plurality of memory cells MC may be erased when an erase voltage is applied to the memory cell array 11 and are programmed when a program voltage is applied to the memory cell array 11. In some embodiments, a memory cell MC may have one of an erase state and first to n-th program states P1 to Pn, which are distinguished according to threshold voltages thereof.

Here, "n" may be a natural number of 2 or more. For example, in the case where a memory cell MC is a 2-bit level cell, "n" may be "3". As another example, in the case where a memory cell MC is a 3-bit level cell, "n" may be "7". As still another example, in the case where a memory cell MC is a 4-bit level cell, "n" may be "15". As such, the memory cells MC may include multi-level cells. However, embodiments are not limited thereto. For example, the memory cells MC may include single level cells.

The control logic circuit 12 may output various control signals for writing data in the memory cell array 11, reading data from the memory cell array 11, or erasing data stored in the memory cell array 11, based on the command CMD, the address ADDR, and the control signal CTRL from the memory controller 120A or 120B. In other words, the control logic circuit 12 may control various kinds of operations of the memory device 110 overall.

The control signals, which may be generated by the control logic circuit 12, may be provided to the voltage generator 13, the row decoder 14, and the page buffer 15. For example, the control logic circuit 12 may provide a voltage control signal CTRL_vol to the voltage generator 13, a row address X-ADDR to the row decoder 14, and a column address Y-ADDR to the page buffer 15, respectively.

The voltage generator 13 may generate various kinds of voltages for performing the program, read, and erase operations with respect to the memory cell array 11, based on the voltage control signal CTRL_vol. In detail, the voltage generator 13 may generate a first driving voltage VWL for driving the word lines WL, a second driving voltage VSSL for driving a plurality of string selection lines SSL, and a third driving voltage VGSL for driving a plurality of ground selection lines GSL.

In some embodiments, the first driving voltage VWL may be a program voltage (or write voltage), a read voltage, an erase voltage, a pass voltage, or a program verification voltage. In some embodiments, the second driving voltage VSSL may be a string selection voltage, that is, an on voltage or an off voltage. In some embodiments, the third driving voltage VGSL may be a ground selection voltage, that is, the on voltage or the off voltage.

The row decoder 14 may be connected to the memory cell array 11 through the word lines WL and may activate some of the word lines WL in response to the row address X-ADDR received from the control logic circuit 12. In detail, during the read operation, the row decoder 14 may apply the read voltage to a selected word line and the pass voltage to each of unselected word lines.

Meanwhile, during the program operation, the row decoder 14 may apply the program voltage to the selected word line and the pass voltage to each of the unselected word lines.

During the erase operation, the row decoder 14 may apply the erase voltage (e.g., 0 V) to the word lines WL while floating the string selection line SSL and the ground selection line GSL.

The page buffer 15 may be connected to the memory cell array 11 through the bit lines BL. In detail, during the read operation, the page buffer 15 may operate as a sense amplifier to output data stored in the memory cell array 11. Meanwhile, during the program operation, the page buffer 15 may operate as a write driver to input data to be stored to the memory cell array 11.

Figure 4:
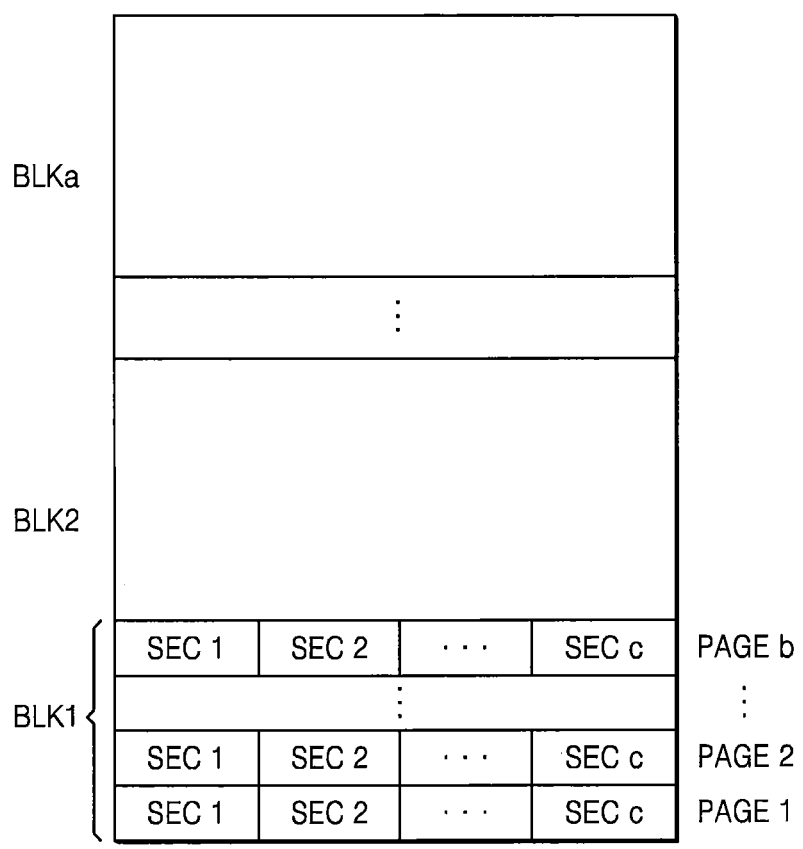
FIG. 4 is a schematic block diagram illustrating the memory cell array of FIG. 3 according to some embodiments of the inventive concepts.

FIG. 4 is a schematic block diagram illustrating the memory cell array of FIG. 3 according to some embodiments of the inventive concepts.

Referring to FIG. 4, the memory cell array 11 may be a flash memory cell array. In some embodiments, the memory cell array 11 may include "a" memory blocks BLK1 to BLKa ("a" being a plural integer of 2 or more), each of which includes "b" pages PAGE1 to PAGEb ("b" being a plural integer of 2 or more). Each of the pages PAGE1 to PAGEb may include "c" sectors SEC1 to SECc ("c" being a plural integer of 2 or more). For ease of illustration, the pages PAGE1 to PAGEb and the sectors SEC1 to SECc of the memory block BLK1 are only illustrated in FIG. 4. However, the other memory blocks BLK2 to BLKa may have a structure similar to that of the memory block BLK1.

Figure 5:
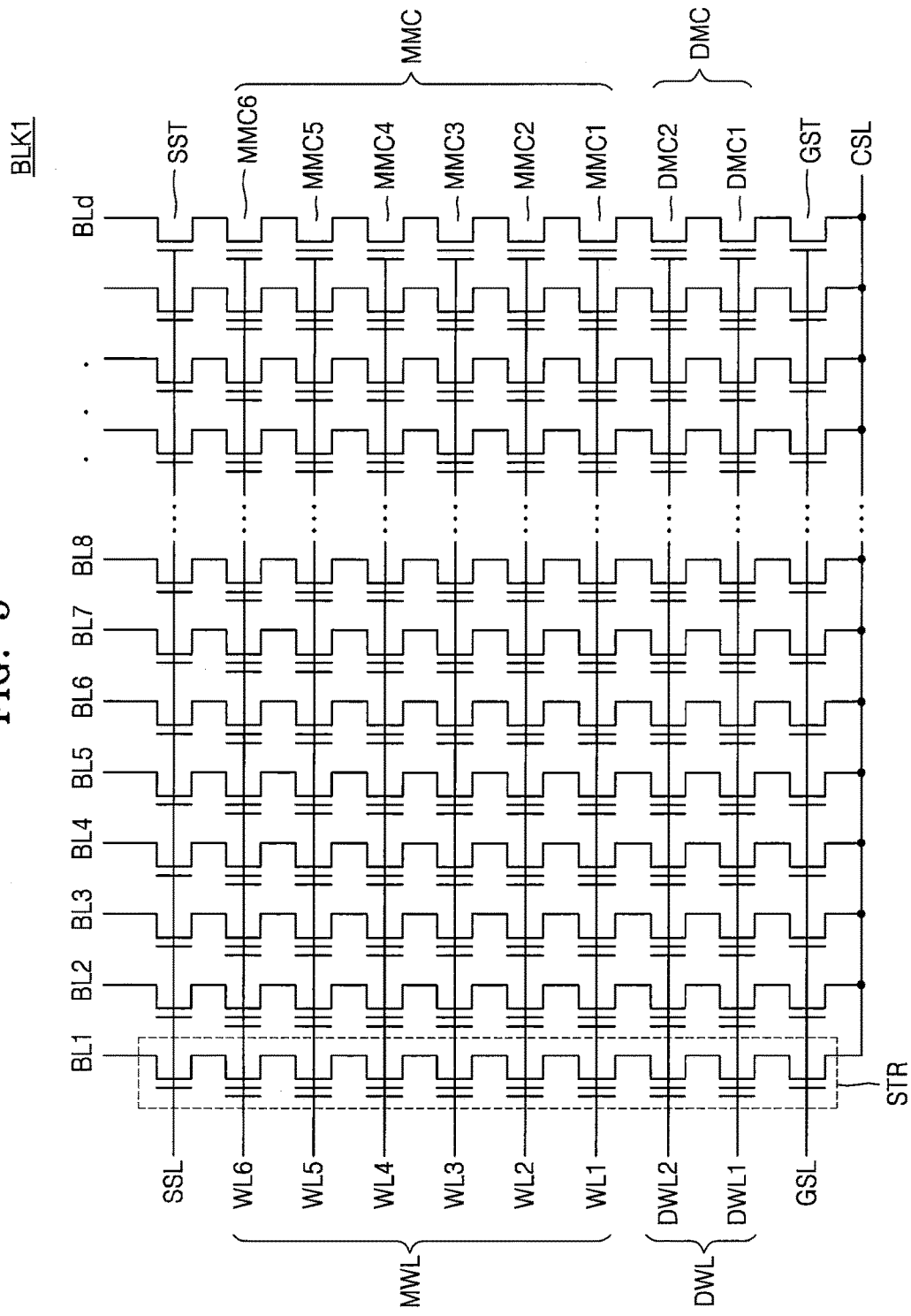
FIG. 5 is a circuit diagram illustrating a memory block included in the memory cell array of FIG. 4 according to some embodiments of the inventive concepts.

FIG. 5 is a circuit diagram illustrating a memory block included in the memory cell array of FIG. 4 according to some embodiments of the inventive concepts.

Referring to FIG. 5, a first memory block BLK1 may be a memory block of a planar NAND flash memory device, and each of the memory blocks BLK1 to BLKa illustrated in FIG. 4 may be implemented as illustrated in FIG. 5. The first memory block BLK1 may include "d" cell strings STR, in each of which a plural number of memory cells, for example, eight memory cells, may be serially connected to each other. Each cell string STR may include a string selection transistor SST and a ground selection transistor GST that are respectively connected to opposite ends of the serially connected memory cells. One or more memory cells, which are arranged adjacent to the ground selection transistor GST, from among the eight memory cells included in one cell string, may be respectively used as one or more dummy memory cells.

Some embodiments, as illustrated in FIG. 5, may include two memory cells, which are arranged adjacent to the ground selection transistor GST, that are respectively used as dummy memory cells DMC. Accordingly, six memory cells among the eight memory cells included in one cell string may be respectively used as main memory cells MMC. As another example, one or more dummy memory cells may be further arranged between the string selection transistor SST and the main memory cells MMC.

The dummy memory cells DMC may be connected to a dummy word line DWL, and the main memory cells MMC may be connected to a main word line MWL. To reduce coupling influence of the common source line CSL on the main memory cells MMC, the dummy memory cell(s) may be arranged between the ground selection transistor GST and the main memory cells MMC1 to MMC6. That is, one or more dummy memory cells may be arranged at one edge of the main memory cells MMC.

Here, the number of cell strings STR, the number of dummy word lines DWL, the number of main word lines MWL, and the number of bit lines BL may be variously changed according to embodiments.

As another example, each memory block may be implemented to include only the main memory cells MMC while the dummy memory cells are not arranged therein.

The NAND flash memory device having a structure as illustrated in FIG. 5 may perform an erase operation in units of memory blocks and may perform a program operation in units of pages each corresponding to a word line. For example, in the case where a memory cell is a single level cell, one page may correspond to one word line. As another example, in the case where a memory cell is a multi-level cell or triple level cell, a plurality of pages may correspond to one word line.

Figure 6:
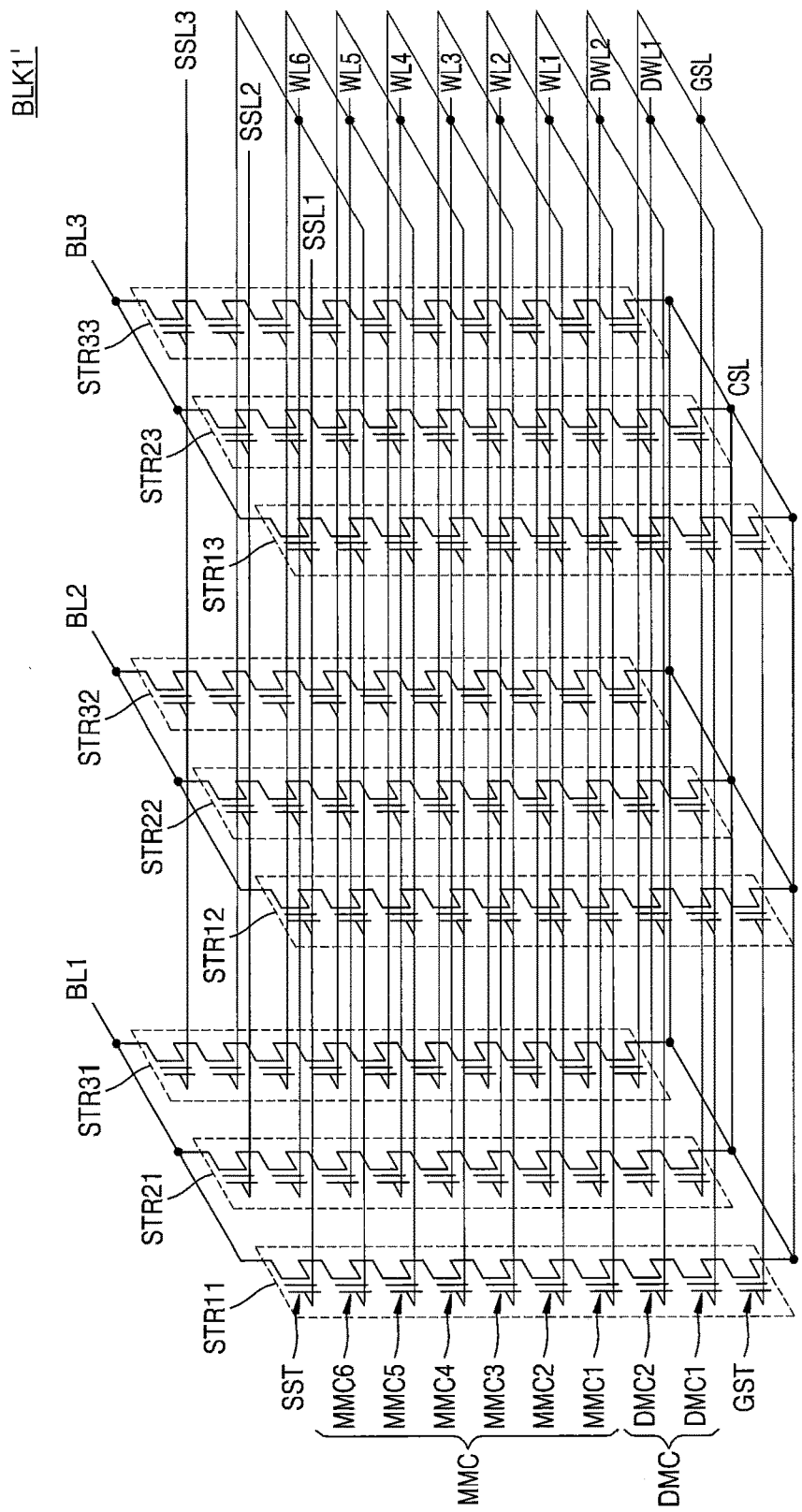
FIG. 6 is a circuit diagram illustrating a memory block included in the memory cell array of FIG. 4 according to some embodiments of the inventive concepts.

FIG. 6 is a circuit diagram illustrating a memory block included in the memory cell array of FIG. 4 according to some embodiments of the inventive concepts.

Referring to FIG. 6, a first memory block BLK1' may be a memory block of the vertical NAND flash memory device, and each of the memory blocks BLK1 to BLKa illustrated in FIG. 4 may be implemented as illustrated in FIG. 6. The first memory block BLK1' may include a plurality of cell strings STR11 to STR33, a plurality of word lines DWL1, DWL2, and WL1 to WL6, a plurality of bit lines BL1 to BL3, a ground selection line GSL, a plurality of string selection lines SSL1 to SSL3, and a common source line CSL. Here, the number of cell strings, the number of word lines, the number of bit lines, the number of ground selection lines, and the number of string selection lines may be variously changed according to some embodiments.

The cell strings STR11 to STR33 may be connected between the bit lines BL1 to BL3 and the common source line CSL. Each cell string (e.g., STR11) may include a string selection transistor SST, a plurality of memory cells DMC and MMC, and a ground selection transistor GST that are serially connected to each other.

Some embodiments, as illustrated in FIG. 6, may include two memory cells, which are arranged adjacent to the ground selection transistor GST, that are respectively used as dummy memory cells DMC. Accordingly, six memory cells among the eight memory cells included in one cell string may be respectively used as main memory cells MMC. As another example, one or more dummy memory cells may be further arranged between the string selection transistor SST and the main memory cells MMC.

The string selection transistors SST may be connected to the string selection lines SSL1 to SSL3. In a string, the memory cells MMC1 to MMC6 may be connected to the word lines WL1 to WL6, respectively. The ground selection transistors GST may be connected to a ground selection line GSL. In a string, the string selection transistor SST may be connected to one of the bit lines BL1, BL2, and BL3, and the ground selection transistor GST may be connected to the common source line CSL.

Word lines (e.g., WL1) of the same height may be connected in common to each other, and the string selection lines SSL1 to SSL3 may be separated from each other. The word line WL1 and the string selection line SSL1 may be selected upon programming of memory cells that are connected to the word line WL1 and belong to the cell strings STR11, STR12, and STR13.

Figure 7:
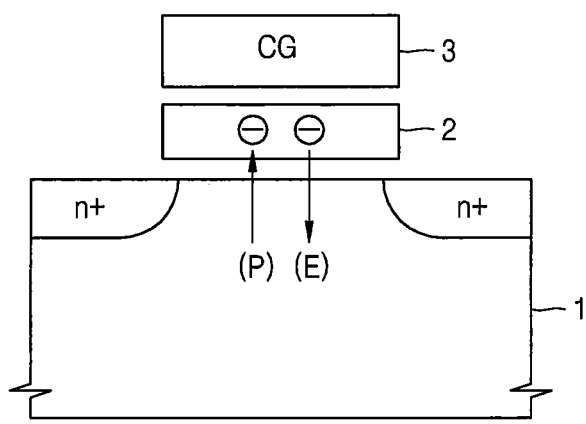
FIG. 7 is a cross-sectional view schematically illustrating a memory cell included in the memory block of FIG. 5 or 6 according to some embodiments of the inventive concepts.

FIG. 7 is a cross-sectional view schematically illustrating a memory cell included in the memory block of FIG. 5 or 6 according to some embodiments of the inventive concepts.

Referring to FIG. 7, the memory cell may be the dummy memory cell DMC or the main memory cell MMC. The memory cell may include a channel region 1, a charge storage layer 2, and a control gate 3. In some embodiments, the charge storage layer 2 may be formed of a floating gate being a conductor, and the memory cell having the above-described structure may be referred to, for example, as a "floating gate structured cell". In some embodiments, the charge storage layer 2 may be formed of a non-conductor, for example, silicon nitride (SiN), and the memory cell having the above-described structure may be referred to, for example, as a "charge trap flash (CTF) cell".

To perform a program operation on the memory cell, a relatively high program voltage may be applied to the control gate 3, and a relatively low voltage (e.g., 0 V) may be applied to the channel region 1. Since an electric field is formed according to the bias condition in a direction from the control gate 3 to the channel region 1, charges, for example electrons, migrate to the charge storage layer 2 from the channel region 1 along the arrow "P". Accordingly, the memory cell may be programmed.

To perform an erase operation on the memory cell, a relatively low erase voltage (e.g., 0 V) may be applied to the control gate 3, and a relatively high voltage may be applied to the channel region 1. Since an electric field is formed according to the bias condition in a direction from the channel region 1 to the control gate 3, charges, for example electrons, migrate to the channel region 1 from the charge storage layer 2 along the arrow "E". Accordingly, the memory cell may be erased.

The reliability of the memory cell may be lowered when the erase and program operations are repeated at fast cycles.

Figure 8A:
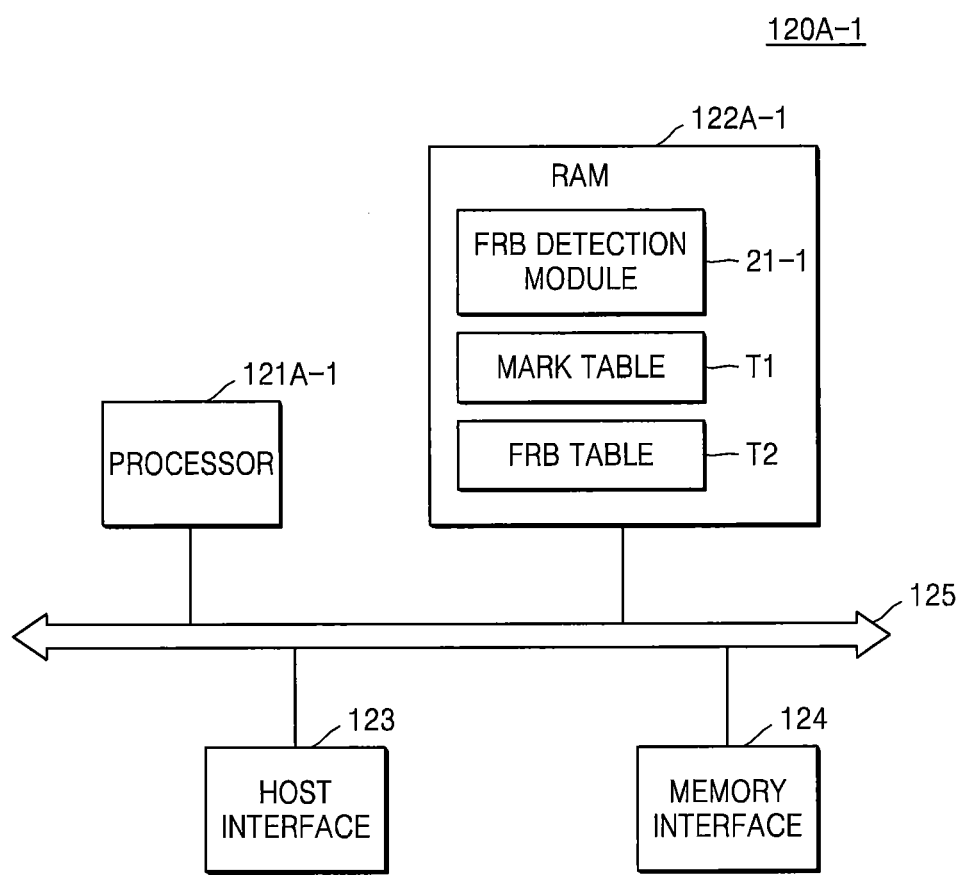
FIG. 8A illustrates a configuration of the memory controller of FIG. 1 according to some embodiments of the inventive concepts.

FIG. 8A illustrates a configuration of the memory controller of FIG. 1 according to some embodiments of the inventive concepts.

Referring to FIG. 8A, a memory controller 120A-1 may include a processor 121A-1, random access memory (RAM) 122A-1, a host interface 123, a memory interface 124, and a bus 125.

The elements of the memory controller 120A-1 may be electrically connected to each other through the bus 125.

The processor 121A-1 may control overall operations of the memory system 100A by using program codes and data that are stored in the RAM 122A-1. For example, the processor 121A-1 may be implemented with a microprocessor or a central processing unit (CPU). When the memory system 100A is initialized, the processor 121A-1 may read program codes and data, which are needed to control operations of the memory system 100A, from the memory device 110 and load the read program codes and data on the RAM 122A-1.

A program code of an FRB detection module 21-1, which may be implemented by software, may be stored in the RAM 122A-1. Also, information that is generated while the FRB detection module 21-1 is operating may be stored in the RAM 122A-1. For example, a mark table T1 and an FRB table T2 may be stored in the RAM 122A-1. The mark table T1 may be used to store a block address, an erase time, and a fast reuse count NOF of a reference block, which is selected at the initially set period, from among memory blocks of the free block list, which transition to active blocks. A block address and a fast reuse count NOF of a memory block determined as a fast reuse memory block may be stored in the FRB table T2. As another example, the mark table T1 may be used to store a program time when a program operation is performed on an initially set reference page in a memory block, instead of the erase time. For example, a page of a memory block, which is programmed for the first time, may be determined as the reference page.

A program code for a process to be performed on a host interface layer (HIL) and a program code for a process to be performed on a flash translation layer (FTL) may be also loaded on the RAM 122A-1.

The processor 121A-1 may provide the memory device 110 with a read command and an address during the read operation, with a program command, an address, and data during the program operation, and with an erase command and an address during the erase operation. The processor 121A-1 may perform a fast reuse memory block detection operation, for example according to flowcharts illustrated in FIGS. 16 to 19, by using the program code of the FRB detection module 21-1 that is stored in the RAM 122A-1. The fast reuse memory block detection operation using the program code of the FRB detection module 21-1 will be more fully described with reference to FIGS. 10 to 15.

The host interface 123 may have a protocol for exchanging data with a host (not illustrated) connected with the memory system 100A and may connect the host with the memory system 100A. The host interface 123 may be implemented with, but is not limited to, an advanced technology attachment (ATA) interface, a serial ATA (SATA)

interface, a parallel ATA (PATA) interface, a universal serial bus (USB) or serial attached small computer system interface (SAS), a small computer system interface (SCSI), an embedded multimedia card (eMMC) interface, or a universal flash storage (UFS) interface. Under control of the processor 121A-1, the host interface 123 may receive a command, an address, and data from the host or transmit data to the host.

The flash interface 124 may be electrically connected with memory device 110. Under control of the processor 121A-1, the memory interface 124 may transmit a command, an address, and data to the memory device 110 or receive data from the memory device 110. The memory interface 124 may be configured to support a NAND flash memory or NOR flash memory. The memory interface 124 may be configured such that software or hardware interleaving operations are performed through a plurality of channels.

Figure 8B:
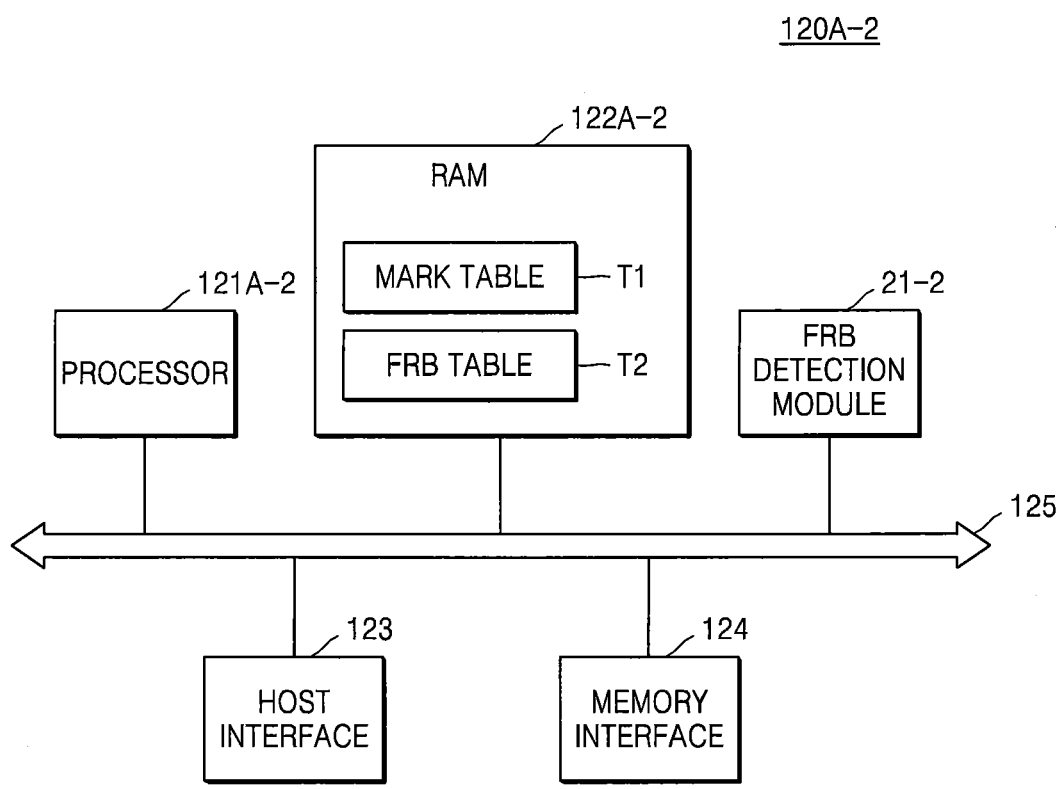
FIG. 8B illustrates a configuration of the memory controller of FIG. 1 according to some embodiments of the inventive concepts.

FIG. 8B illustrates a configuration of the memory controller of FIG. 1 according to some embodiments of the inventive concepts.

Referring to FIG. 8B, a memory controller 120A-2 may include a processor 121A-2, RAM 122A-2, an FRB detection module 21-2, the host interface 123, the memory interface 124, and the bus 125.

In some embodiments, the FRB detection module 21, which is included in the memory controller 120A illustrated in FIG. 1, may be implemented by software, as illustrated in FIG. 8A. However, in some embodiments, the FRB detection module 21 may be implemented with hardware, as illustrated in FIG. 8B.

Program codes and data, which may be needed to control operations of the memory system 100A, may be stored in the RAM 122A-2. For example, when the memory system 100A is initialized, the processor 121A-2 may read the program codes and data, which may be needed to control the operations of the memory system 100A, from the memory device 110 and may load the read program codes and data on the RAM 122A-2. Also, information that is generated while the FRB detection module 21-2 is operating may be stored in the RAM 122A-2. For example, the mark table T1 and the FRB table T2 may be stored in the RAM 122A-2.

In addition, a program code for a process to be performed on the HIL and a program code for a process to be performed on the FTL may be loaded on the RAM 122A-2.

The FRB detection module 21-2 may be implemented with a logic circuit that performs an operation of detecting fast reuse memory blocks. For example, the FRB detection module 21-2 may perform a fast reuse memory block detection operation, for example as according to the flowcharts illustrated in FIGS. 16 to 19. The fast reuse memory block detection operation using the logic circuit of the FRB detection module 21-2 will be more fully described with reference to FIGS. 10 to 15.

The processor 121A-2 may control overall operations of the memory system 100A by using program codes and data stored in the RAM 122A-2. The processor 121A-2 may provide the memory device 110 with a read command and an address during the read operation, with a program command, an address, and data during the program operation, and with an erase command and an address during the erase operation.

The host interface 123, the memory interface 124, and the bus 125 are described with reference to FIG. 8, and thus, a complete description thereof may not be repeated here.

Figure 9A:
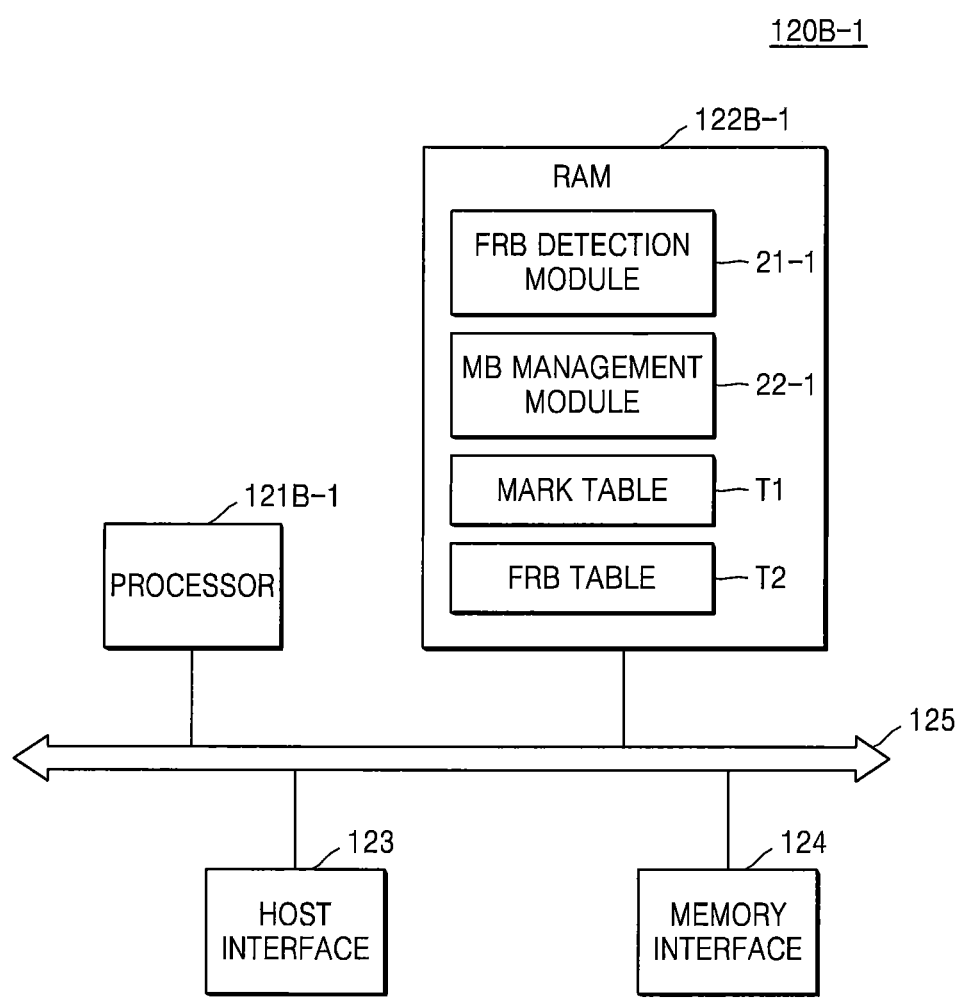
FIG. 9A illustrates a configuration of the memory controller of FIG. 2 according to some embodiments of the inventive concepts.

FIG. 9A illustrates a configuration of the memory controller of FIG. 2 according to some embodiments of the inventive concepts.

Referring to FIG. 9A, a memory controller 120B-1 may include a processor 121B-1, RAM 122B-1, the host interface 123, the memory interface 124, and the bus 125.

The elements of the memory controller 120B-1 may be electrically connected to each other through the bus 125.

The processor 121B-1 may control overall operations of the memory system 100B by using program codes and data stored in the RAM 122B-1. For example, the processor 121B-1 may be implemented with a microprocessor or a CPU. When the memory system 100B is initialized, the processor 121B-1 may read program codes and data, which may be needed to control operations of the memory system 100B, from the memory device 110 and load the read program codes and data on the RAM 122B-1. Program codes of the FRB detection module 21-1 and an MB management module 22-1, which may be respectively implemented by software, may be stored in the RAM 122B-1.

Also, information that is generated while the FRB detection module 21-1 or the MB management module 22-1 is operating may be stored in the RAM 122B-1. For example, the mark table T1 and the FRB table T2 may be stored in the RAM 122B-1. A program code for a process to be performed on the HIL and a program code for a process to be performed on the FTL may be also loaded on the RAM 122B-1.

The processor 121B-1 may provide the memory device 110 with a read command and an address during the read operation, with a program command, an address, and data during the program operation, and with an erase command and an address during the erase operation. Also, the processor 121B-1 may perform a fast reuse memory block detection operation or a memory block management operation, for example according to the flowcharts illustrated in FIGS. 16 to 20, by using the program code of the FRB detection module 21-1 or the MB management module 22-1, which may be stored in the RAM 122B-1. The fast reuse memory block detection operation using the program code of the FRB detection module 21-1 will be more fully described with reference to FIGS. 10 to 15.

The host interface 123 and the memory interface 124 are described with reference to FIG. 7A, and thus, a complete description thereof may not be repeated here.

Figure 9B:
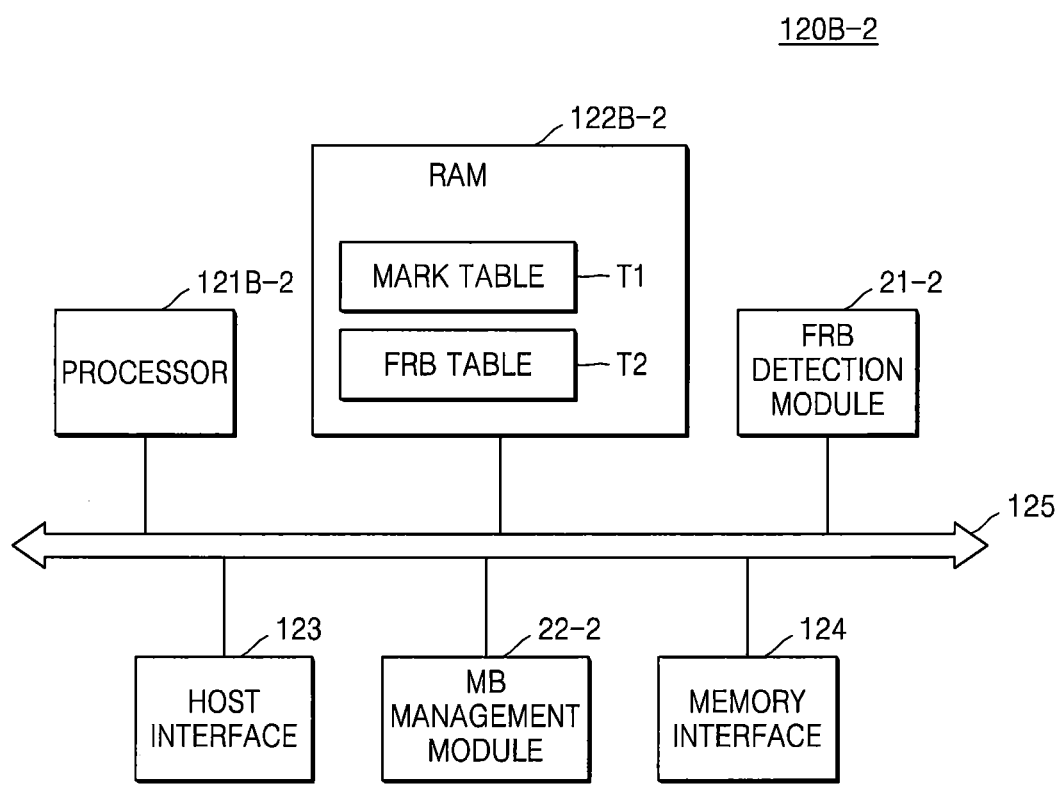
FIG. 9B illustrates a configuration of the memory controller of FIG. 2 according to some embodiments of the inventive concepts.

FIG. 9B illustrates a configuration of the memory controller of FIG. 2 according to some embodiments of the inventive concepts.

Referring to FIG. 9B, a memory controller 120B-2 may include a processor 121B-2, RAM 122B-2, the FRB detection module 21-2, the MB management module 22-2, the host interface 123, the memory interface 124, and the bus 125.

In some embodiments, the FRB detection module 21 and the MB management module 22, which are included in the memory controller 120B illustrated in FIG. 2, may be respectively implemented by software, as illustrated in FIG. 9A. However, in some embodiments, the FRB detection module 21 and the MB management module 22 may be respectively implemented with hardware, as illustrated in FIG. 9B.

Program codes and data, which may be needed to control operations of the memory system 100B, may be stored in the RAM 122B-2. For example, when the memory system 100B is initialized, the processor 121B-2 may read the program codes and data, which may be needed to control the operations of the memory system 100B, from the memory device 110 and may load the read program codes and data on the RAM 122B-2. Also, information that is generated while the FRB detection module 21-2 or the MB management module 22-2 is operating may be stored in the RAM 122B-2. For example, the mark table T1 and the FRB table T2 may be stored in the RAM 122B-2. In addition, a program code for a process to be performed on the HIL and a program code for a process to be performed on the FTL may be loaded on the RAM 122B-2.

The FRB detection module 21-2 may be implemented with a logic circuit that performs an operation of detecting fast reuse memory blocks. The MB management module 22-2 may be implemented with a logic circuit that manages fast reuse memory blocks. Also, the processor 121B-2 may perform a fast reuse memory block detection operation or a memory block management operation, for example according to the flowcharts illustrated in FIGS. 16 to 20, by using the logic circuit of the FRB detection module 21-2 or the MB management module 22-2. The fast reuse memory block detection operation using the logic circuit of the FRB detection module 21-2 will be more fully described with reference to FIGS. 10 to 15.

The processor 121B-2 may control overall operations of the memory system 100B by using program codes and data stored in the RAM 122B-2. The processor 121B-2 may provide the memory device 110 with a read command and an address during the read operation, with a program command, an address, and data during the program operation, and with an erase command and an address during the erase operation.

The host interface 123 and the memory interface 124 are described with reference to FIG. 8A, and thus, a complete description thereof may not be repeated here.

Figure 10:
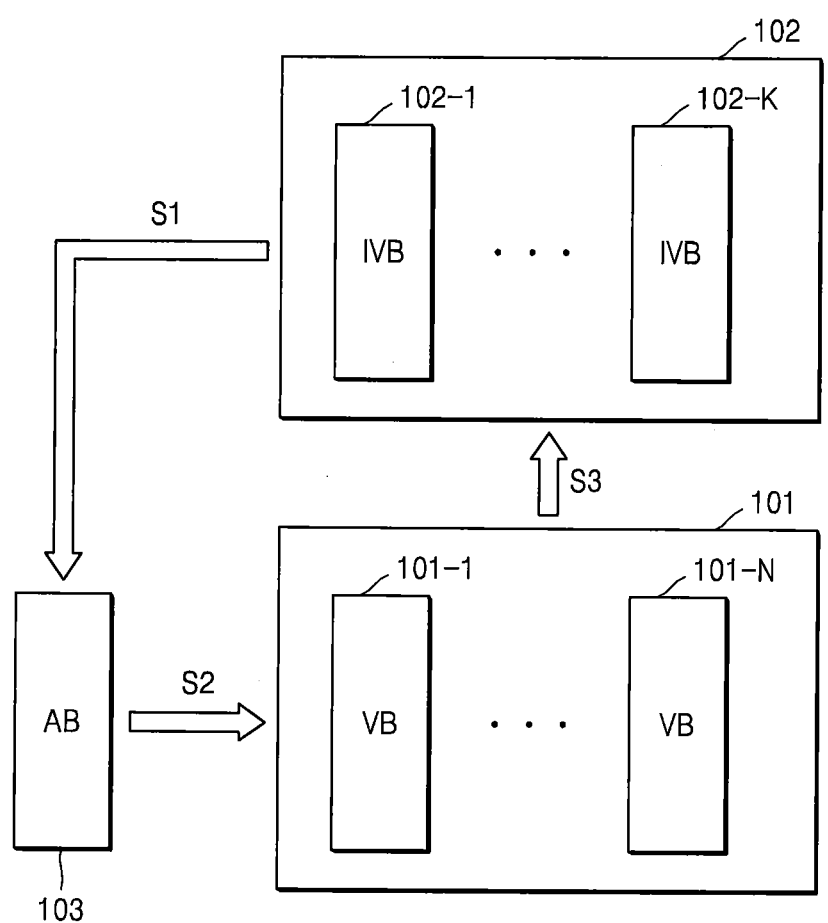
FIG. 10 is a block diagram conceptually illustrating a memory block management method of the memory system of FIG. 1 or 2 according to some embodiments of the inventive concepts.

FIG. 10 is a block diagram conceptually illustrating a memory block management method of the memory system of FIG. 1 or 2 according to some embodiments of the inventive concepts.

Referring to FIG. 10, memory blocks of the memory device 110 may be classified into free blocks, active blocks, and data blocks. A free block may be a memory block IVB, in which pieces of invalid data are stored in programmable pages, that is, a memory block that does not include empty pages being programmable. An active block may be a memory block AB that includes empty pages capable of storing data. A data block may be a memory block VB that includes at least one page programmed with valid data but does not include empty pages being programmable.

Data blocks 101-1 to 101-N may be included in a data block pool 101, and free blocks 102-1 to 102-K may be included in a free block pool 102.

In the case where a selected active block does not exist, one free block is selected from the free blocks 102-1 to 102-N in the free block pool 102 (S1). Since all programmable pages of the selected free block are programmed with invalid data, the erase operation is performed on the selected free block. After erased, the selected free block may operate as an active block 103.

If data is programmed in all programmable pages of the active block 103 through the program operations, the active block 103 migrates to the data block pool 101 (S2).

A data block, which does not include a valid page, from among the data blocks 101-1 to 101-N in the data block pool 101 migrates to the free block pool 102 (S3). For example, if a garbage collection operation is performed on a selected victim block, valid pages may be absent in the victim block. As another example, in the case where pieces of data stored in a data block are all updated, a valid page may be absent in the data block.

For convenience of description, an operation of detecting a fast reuse memory block by using such a scheme that an erase time is managed by using the mark table T1 will be described below. As described above, also, it may be possible to detect a fast reuse memory block by using such a scheme that a program time of a page in a memory block is managed by using the mark table T1.

Figure 11A:
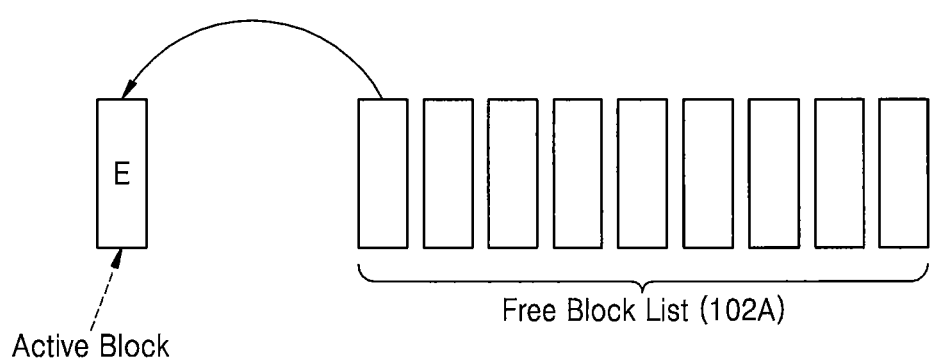
Figure 11B:
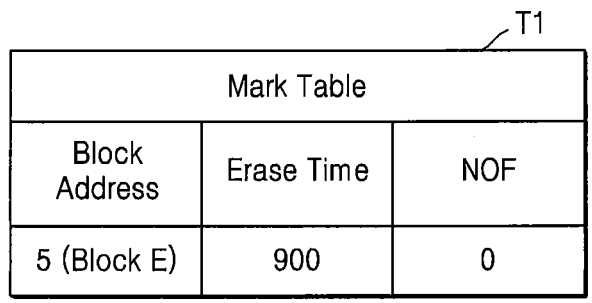

FIGS. 11A to 11C are views illustrating a mark table management operation that is performed according to a fast reuse memory block detection method of the memory system of FIG. 1 or 2 according to some embodiments of the inventive concepts.

Referring to FIGS. 11A to 11C, the FRB detection module 21 may select an active block for fast reuse detection from free blocks in a free block list 102A at an initially set first period (e.g., 10 seconds). For example, the FRB detection module 21 may randomly select some of the free blocks in the free block list 102A, make a transition from the selected free blocks to the active blocks, and select the reference block from the free blocks transitioning to the active blocks at the initially set period. As another example, the FRB detection module 21 may make a transition from the memory blocks in the free block list 102A to the active blocks based on the order of memory blocks registered in the free block list 102A as a free block and select the reference block from the free blocks transitioning to the active blocks at the initially set period.

As such, an active block, which is selected at the first period, is the reference block. An example, in which a memory block "E" included in the free block list 102A is selected as an active block, is illustrated in FIG. 11A.

The FRB detection module 21 may detect an erase time of the memory block "E" as the reference block. The erase time of the memory block "E" is registered in the mark table T1 to manage an erase time of the reference block. As used herein, the erase time may be a time corresponding to a point in time when an erase operation of a memory block occurs.

For example, as illustrated in FIG. 11B, the memory block "E" may have a block address of "5" and may be registered in the mark table T1 as the reference block with an erase time of 900 seconds. The fast reuse count NOF may be, for example, "0" when the memory block "E" is registered as the reference block.

The FRB detection module 21 may compute a use interval of the memory block "E" if the memory block "E" registered in the mark table T1 again goes to an active block within the first period. For example, if the erase time of the memory block "E" again selected as the active block is 905 seconds, the use interval of the memory block "E" is 5 seconds. In other words, in this example, the previously registered erase time of 900 seconds is subtracted from the new erase time of 905 seconds to compute a use interval of 5 seconds. In other words, in this example, there were five seconds between the erase times corresponding to the two times that the same memory block "E" was selected as the active block. In this example, the use interval of the memory block "E" has the same meaning as an erase interval of the memory block "E". The memory block "E" may be determined as the fast reuse memory block if the determined use interval of the memory block "E" is less than or equal to the first threshold value TH1. For example, in the case where the first threshold value TH1 is set to 5 seconds, the memory block "E", of which the computed use interval in this example is 5 seconds, may be determined as the fast reuse memory block.

When the memory block "E" registered in the mark table T1 is determined as the fast reuse memory block, the FRB detection module 21 may increase the fast reuse count NOF of the memory block "E" in the mark table T1 and may fix the memory block "E" in the mark table T1. As such, as illustrated in FIG. 11C, the erase time of the memory block "E" registered in the mark table T1 may be updated with 905 seconds, and the fast reuse count NOF may be set to 1.

Figure 12A:
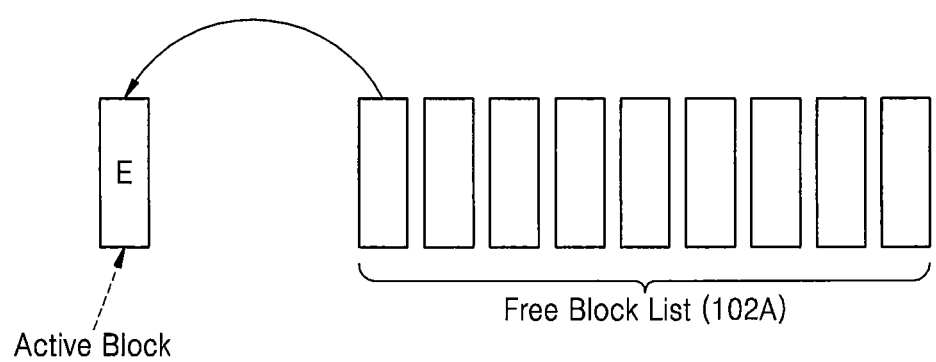
Figure 12C:
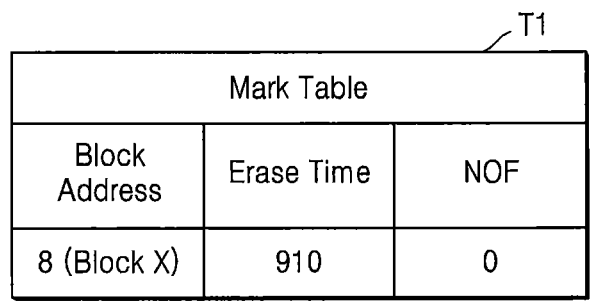

FIGS. 12A to 12C are views illustrating a mark table management operation that is performed according to a fast reuse memory block detection method of the memory system of FIG. 1 or 2 according to some embodiments of the inventive concepts.

The FRB detection module 21 may select an active block for fast reuse detection from free blocks in the free block list 102A at the initially set first period (e.g., 10 seconds). As such, the selected active block may be the reference block. An example, in which the memory block "E" in the free block list 102A is selected as an active block, is illustrated in FIG. 12A.

The FRB detection module 21 may measure an erase time of the memory block "E" as the reference block. The erase time of the memory block "E" may be registered in the mark table T1 to manage an erase time of the reference block. For example, as illustrated in FIG. 12B, the memory block "E" may have a block address is "5" and may be registered in the mark table T1 as the reference block with an erase time of 900 seconds. The fast reuse count NOF may be "0" when the memory block "E" is registered as the reference block.

If the memory block "E" registered in the mark table T1 is not again detected as an active block within the first period, the FRB detection module 21 may select a new active block as the reference block and may register the selected new active block in the mark table T1. For example, if a memory block "X" is selected as the new memory block at 910 seconds, a block address and an erase time of the memory block "X" may be registered in the mark table T1 as illustrated in FIG. 12C. In this case, it may be understood from FIGS. 12B and 12C that the reference block switches from the memory block "E", as illustrated in FIG. 12B, to the memory block "X", as illustrated in FIG. 12C.

Figure 13A:
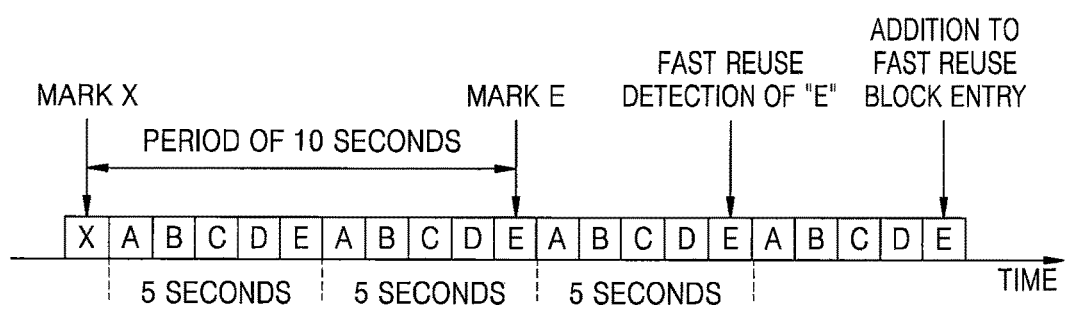
Figure 13B:
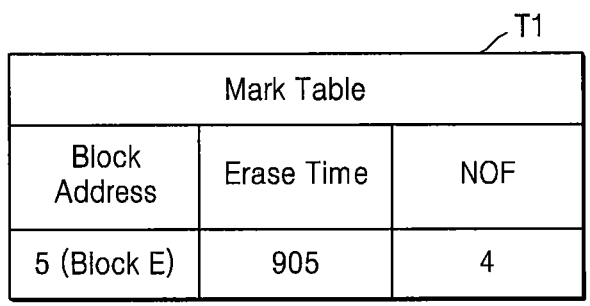

FIGS. 13A to 13C are views illustrating a mark table and a fast reuse block table that are managed according to a fast reuse memory block detection method of the memory system of FIG. 1 or 2 according to some embodiments of the inventive concepts.

FIG. 13A illustrates memory blocks used as time passes. For example, an example, in which the reference block is marked at a period of 10 seconds and the first threshold value TH1 is set to 5 seconds, is illustrated in FIG. 13A.

Referring to FIG. 13A, a new memory block "E" may be marked as the reference block if the memory block "X" is not reused within the period of 10 seconds after being marked as the reference block for the first time. The memory block "E" may be detected as the fast reuse memory block if the memory block "E" is again selected as an active block after the memory block "E" is marked as the reference block and a time period equal to or less than the first threshold value TH1 of, in this example, 5 seconds, has elapsed.

For reference, since the first threshold value TH1 is set to 5 seconds, the memory block "E", of which the use interval is 5 seconds, may be determined as the fast reuse memory block. Accordingly, the memory block "E" may be fixed in the mark table T1. Also, the fast reuse count NOF may be increased.

For example, the fast reuse count NOF of the memory block "E" may be determined by adding "1" to a value that is obtained by dividing a time interval of one period for selecting the reference block by an erase interval of the reference block determined as the fast reuse memory block. Referring to FIG. 13A, the fast reuse count NOF of the memory block "E" at a point in time when the memory block "E" is detected as the fast reuse memory block may be computed as follows. That is, when a time interval of one period for selecting the reference block is 10 seconds and an erase cycle of the memory block "E" is 5 seconds, the fast reuse count NOF may be [10/5+1]. In other words, the fast reuse count NOF of the memory block "E" at a point in time when the memory block "E" is detected as the fast reuse memory block may be 3.

If the memory block "E" is again selected as an active block within a fast reuse threshold section after being detected as the fast reuse memory block, memory blocks, which are used as active blocks from a point in time when the memory block "E" is detected as the fast reuse memory block to a point in time when the memory block "E" is again detected as a next fast reuse memory block, may be added to a fast reuse memory block entry.

For example, if the memory block "E" is again selected as an active block within the fast reuse threshold section after the memory block "E" erased at 900 seconds is detected as the fast reuse memory block and is erased at 905 seconds, an address, an erase time, and an NOF of the memory block "E" may be stored in the mark table T1, as illustrated in FIG. 13B. Here, the fast reuse count NOF may be 4. In other words, as described above, when the fast reuse count NOF of the memory block "E" computed at a point in time when the memory block "E" is detected as the fast reuse memory block is 3 at 900 seconds, and when the memory block "E" is again detected as the fast reuse memory block at 905 seconds, the fast reuse count NOF may be increased by one more to be 4.

In other words, FIG. 13A illustrates an example in which a memory block "X" is marked as the reference block at first time with a period of 10 seconds. As described above, the memory block "X" would therefore be stored in the mark table T1. In this example, the memory block "X" is not again selected as an active block within the time period of 10 seconds so another block "E" is selected as the reference block with another period of 10 seconds at a second time that is 10 seconds after the first time. As described above, the memory block "E" would therefore be stored in the mark table T1.

As illustrated in FIG. 13A, the reference block, memory block "E", is selected again as an active block within the time period of 10 seconds, so the memory block "E" remains marked as the active block. Moreover, in this case, the reuse interval of the memory block "E" at this time is less than or equal to the first threshold value TH1 of 5 seconds. Therefore, the memory block "E" is detected as the fast reuse memory block and the mark table T1 is updated to reflect the new erase time and fast reuse count NOF. In this case, the updated fast reuse count NOF would be 3, which may be calculated by adding 1 to the reference block time period of 10 seconds divided by the erase cycle of 5 seconds.

As illustrated in FIG. 13A, the reference block, memory block "E", is selected yet again as an active block within the time period of 10 seconds, so the memory block "E" remains marked as the active block. Moreover, in this case, the reuse interval of the memory block "E" at this time is less than or equal to the first threshold value TH1 of 5 seconds. Therefore, the memory block "E" mark table T1 is updated to reflect the new erase time and fast reuse count NOF. In this case, the updated fast reuse count NOF would be 4, which may be calculated by adding 1 to the previously stored fast reuse count NOF.

As another example, the fast reuse count NOF of the memory block "E" determined at a point in time when the memory block "E" is detected as the fast reuse memory block may be 1 at 900 seconds and may be 2 at 905 seconds when the memory block "E" is again detected as the fast reuse memory block. In this case, the fast reuse count NOF of each of the memory blocks "A", "B", "C", and "D" may be 2.

The memory blocks "A", "B", "C", and "D", which are used as active blocks from a point in time when the memory block "E" is detected as the fast reuse memory block to a point in time when the memory block "E" is again detected as a next fast reuse memory block, may be registered in the FRB table T2 together with the memory block "E" as illustrated in FIG. 13C. For reference, the fast reuse count NOF of each of memory blocks "A", "B", "C", and "D" may be registered with the same value of the fast reuse count NOF of the memory block "E".

Figure 14A:
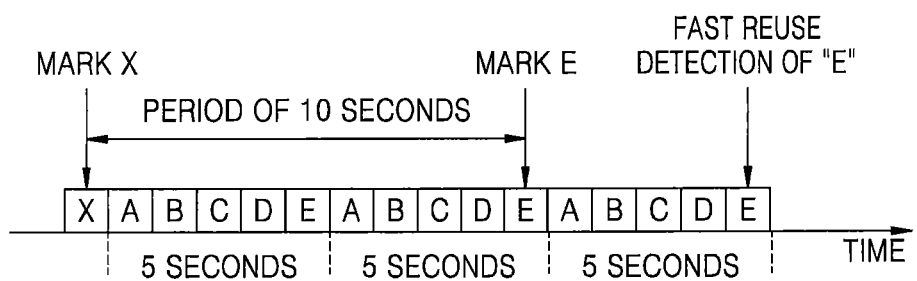
FIGS. 14A and 14B are views illustrating a mark table management operation that is performed according to a fast reuse memory block detection method of the memory system of FIG. 1 or 2 according to some embodiments of the inventive concepts.
Figure 14B:
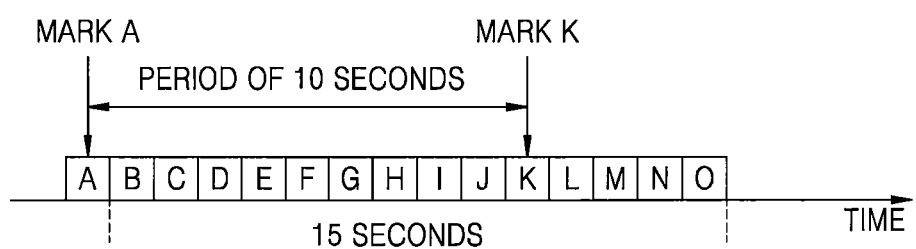

FIGS. 14A and 14B are views illustrating a mark table management operation that is performed according to a fast reuse memory block detection method of the memory system of FIG. 1 or 2 according to some embodiments of the inventive concepts.

FIG. 14A illustrates memory blocks that are erased and reused at a period shorter than a period for marking the reference block. For example, FIG. 14A illustrates a reference block that is marked at a period of 10 seconds and memory blocks "A", "B", "C", "D", and "E" that are repeatedly reused at a period of 5 seconds.

Referring to FIG. 14A, a new memory block "E" may be marked as the reference block when the memory block "X" is not reused within 10 seconds after being marked as the reference block. The memory block "E" may be detected as the fast reuse memory block at a point in time when the memory block "E" is erased and reused after 5 seconds.

Memory blocks that are erased and reused at a period longer than the period for marking the reference block are illustrated in FIG. 14B. For example, FIG. 14B illustrates a reference block being marked at a period of 10 seconds and memory blocks "A" to "0" that are repeatedly reused at a period of 15 seconds.

Referring to FIG. 14B, since a new reference block is marked at a period of 10 seconds, memory blocks that are reused at a period longer than 10 seconds may not be detected as the fast reuse memory blocks. That is, information about an erase time of the previously marked memory block "A" is removed from the mark table T1 when a memory block "K" is marked as a new reference block. Therefore, memory blocks that are reused at a period longer than the period for marking the reference block may not be detected as the fast reuse memory blocks.

Figure 15A:
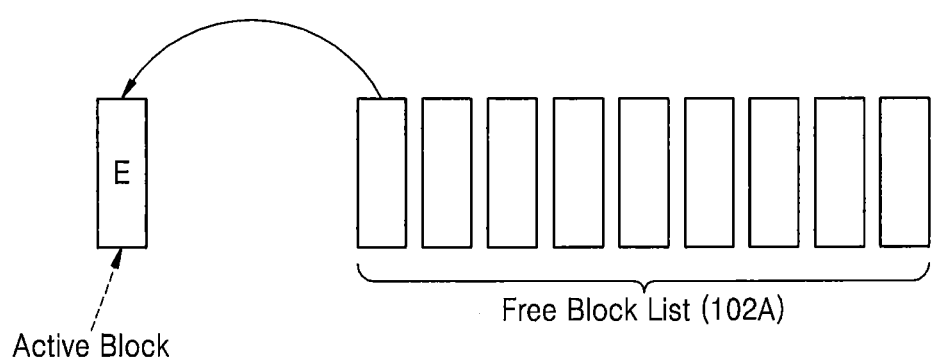

FIGS. 15A and 15B are views illustrating a mark table management operation that is performed according to a fast reuse memory block detection method of the memory system of FIG. 1 or 2 according to some embodiments of the inventive concepts.

Referring to FIG. 15A, the FRB detection module 21 may select an active block for fast reuse detection from free blocks in the free block list 102A. The selected active block may be marked as the reference block. An example, in which the memory block "E" in the free block list 102A is selected as an active block, is illustrated in FIG. 15A.

In the case where reference blocks are set at a plurality of periods, active blocks may be marked as reference blocks for the respective periods. An example of the mark table T1 when a plurality of mark periods are respectively set to 10 seconds, 100 seconds, 500 seconds, and 1000 seconds is illustrated in FIG. 15B.

As such, when a plurality of mark periods are used, it may be possible to effectively detect memory blocks that are repeatedly used at various periods.

Figure 16:
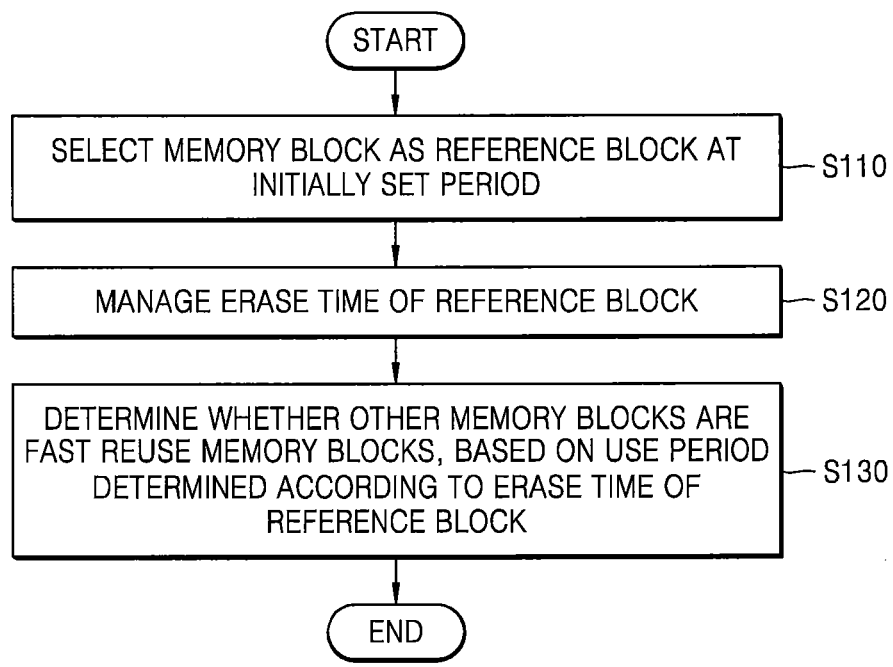
FIG. 16 is a flowchart of a fast reuse memory block detection method according to some embodiments of the inventive concepts.

FIG. 16 is a flowchart of a fast reuse memory block detection method according to some embodiments of the inventive concepts. For example, the flowchart of FIG. 16 may be performed by the memory system of FIG. 1 or 2. Memory controllers of various storage devices may include the memory system. For example, the flowchart of FIG. 16 may be performed by the FRB detection module 21 of the memory controller 120A or 120B.

Referring to FIG. 16, in operation S110, the FRB detection module 21 may select a memory block as the reference block at an initially set period. For example, the FRB detection module 21 may select the reference block from memory blocks that transition to active blocks from among memory blocks in the free block list at the initially set period. For example, the FRB detection module 21 may randomly select some of the memory blocks in the free block list, make a transition from the selected memory blocks to the active blocks, and select the reference block from the memory blocks transitioning to the active blocks at the initially set period. As another example, the FRB detection module 21 may make a transition from the memory blocks in the free block list to the active blocks based on the order of memory blocks registered in the free block list as a free block and select the reference block from the memory blocks transitioning to the active blocks at the initially set period. The selected reference block may be registered in the mark table T1. In some embodiments, reference blocks may be set according to a plurality of periods as described with reference to FIGS. 15A and 15B.

In operation S120, the FRB detection module 21 may manage an erase time of the reference block registered in the mark table T1. For example, a difference between an erase time of the reference block registered in the mark table T1 and a time when the reference block is erased after again being selected as an active block may be calculated as an erase cycle (erase interval) of the reference block. For example, if the calculated erase interval is less than or equal to the first threshold value TH1, the reference block may be fixed in the mark table T1 after being set to the fast reuse memory block. The reference block may not be changed to a new memory block within a section where the reference block is fixed in the mark table T1. For example, operation S110 of selecting the reference block may not be performed within the section where the reference block is already fixed in the mark table T1. As another example, the FRB detection module 21 may manage a program time of the reference block registered in the mark table T1. That is, a difference between a program time of the reference block registered in the mark table T1 and a time when the reference block is programmed after again being selected as an active block may be calculated as a program cycle of the reference block.

In operation S130, the FRB detection module 21 may determine whether other memory blocks are fast reuse memory blocks, based on a use period that is determined according to an erase time (or program time) of the reference block. For example, memory blocks that are used as active blocks during a section where a marked reference block is set to the fast reuse memory block may be determined as fast reuse memory blocks.

Figure 17:
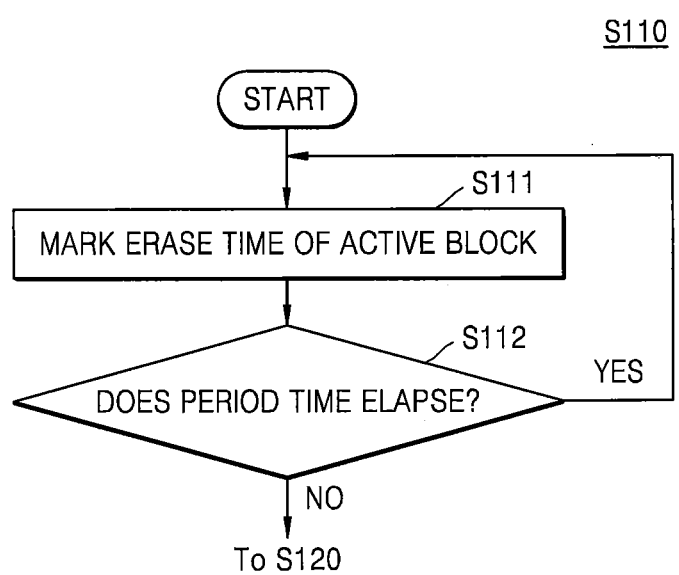
FIG. 17 is a detailed flowchart of the operation of selecting a reference block of FIG. 16 according to some embodiments of the inventive concepts.

FIG. 17 is a detailed flowchart of the operation of selecting a reference block of FIG. 16 according to some embodiments of the inventive concepts.

Referring to FIG. 17, the operation S110 of FIG. 16 may include an operation S111 in which the FRB detection module 21 marks an erase time (or program time) of an active block. For example, the erase time (or program time) may be marked by setting a memory block that is changed from a free block to an active block after the memory system 100A or 100B is initialized as the reference block. For example, the erase time (or program time) of the reference block may be stored in the mark table T1.

In operation S112, the FRB detection module 21 may determine whether a period time for selecting an initially set reference block elapses after the erase time (or program time) of the reference block is marked. If the period time for selecting the initially set reference block does not elapse, the procedure may proceed to operation S120. If the period time for selecting the initially set reference block does elapse, the procedure may return to operation S111 to set a new active block, which may be selected from free blocks, as the reference block and may mark an erase time (or program time) of the newly selected reference block. In this case, the reference block of a previous period marked in the mark table T1 may be replaced with the selected new active block.

Figure 18:
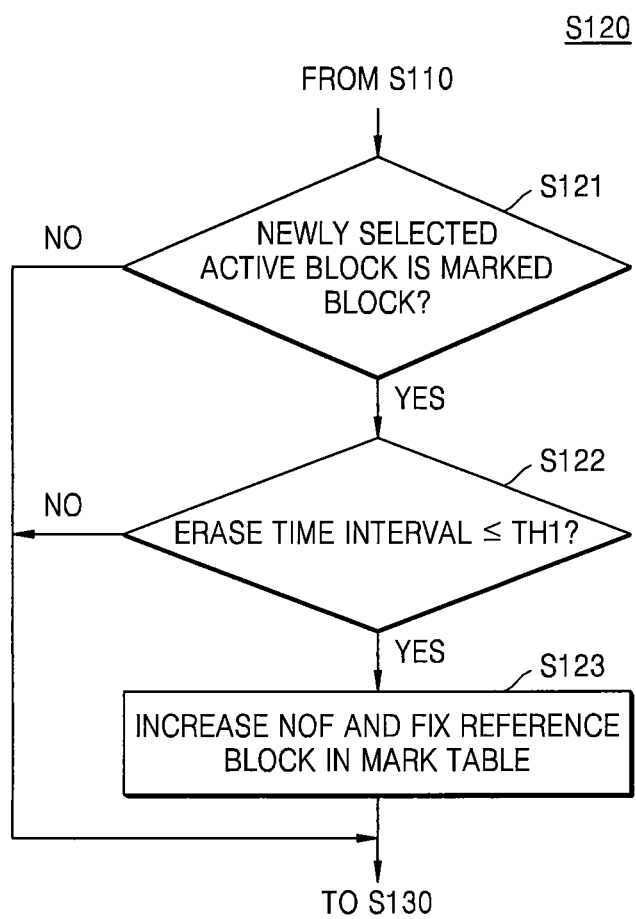
FIG. 18 is a detailed flowchart of the operation of managing an erase time (or program time) of a reference block of FIG. 16 according to some embodiments of the inventive concepts.

FIG. 18 is a detailed flowchart of the operation of managing an erase time (or program time) of a reference block of FIG. 16 according to some embodiments of the inventive concepts.

Referring to FIG. 18, the operation S120 of FIG. 16 may include an operation S121 in which the FRB detection module 21 determines whether a newly selected active block is a marked block. For example, the FRB detection module 21 may determine whether a memory block changed from a free block to an active block is marked in the mark table T1 as the reference block.

If the newly selected active block is the marked block, in operation S122, the FRB detection module 21 may determine whether an erase time interval (or program time interval of an initially set page) of the newly selected active block is less than or equal to the first threshold value TH1. For example, a difference between a time when the newly selected active block is erased and an erase time marked in the mark table T1 may be calculated as the erase time interval (or program time interval) of the newly selected active block.

If it is determined that the erase time interval (or program time interval) of the newly selected active block is less than or equal to the first threshold value TH1, in operation S123, the FRB detection module 21 may increase the fast reuse count NOF of the reference block marked in the mark table T1 and may fix the reference block in the mark table T1. For example, in the case where an active block is determined as the fast reuse memory block for the first time after being marked as the reference block, the fast reuse count NOF may increase from 0 to 1. As another example, in the case where an active block is determined as the fast reuse memory block for the first time after being marked as the reference block, the fast reuse count NOF of the memory block "E" may be determined by adding "1" to a value that is obtained by dividing a time interval of one period for selecting the reference block by an erase interval (or program interval) of the reference block determined as a fast reuse memory block.

Figure 19:
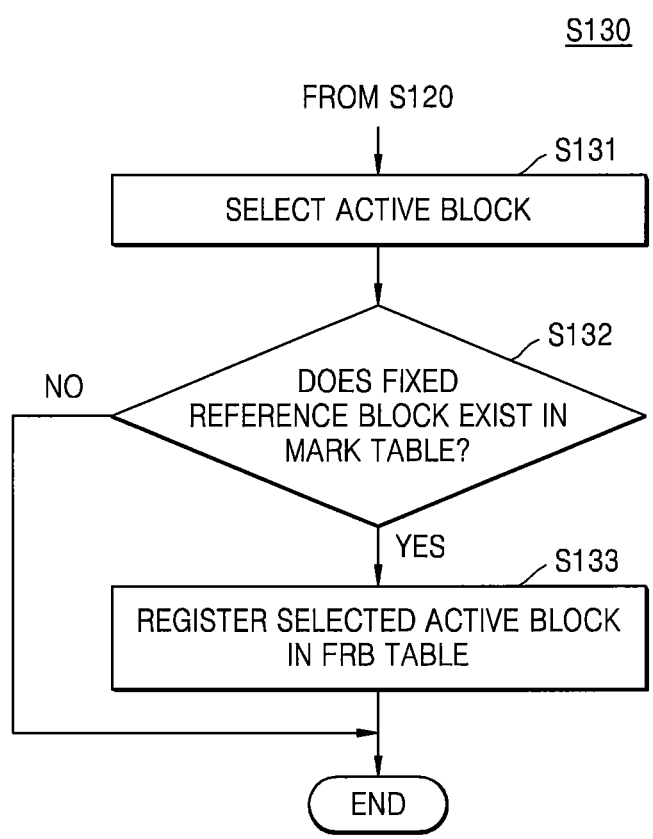
FIG. 19 is a detailed flowchart of the operation of determining whether a memory block is a fast reuse memory block of FIG. 16 according to some embodiments of the inventive concepts.

FIG. 19 is a detailed flowchart of the operation of determining whether a memory block is a fast reuse memory block of FIG. 16 according to some embodiments of the inventive concepts.

Referring to FIG. 19, the operation S130 of FIG. 16 may include an operation S131 in which an active block is selected. When the active block is selected (S131), in operation S132, the FRB detection module 21 may determine whether a fixed reference block is present in the mark table T1. For example, in the case where programmable pages are absent in an active block, one of free blocks in the free block list may be selected as an active block. If the selected active block exists in the mark table T1 as the fixed reference block, the reference block may be detected as the fast reuse memory block.

If it is determined that the fixed reference block exists in the mark table T1, in operation S133, the FRB detection module 21 may determine the active block selected in operation S131 as the fast reuse memory block. For example, memory blocks that are used as active blocks from a point in time when the reference block is detected as the fast reuse memory block to a point in time when the reference block is again detected as a next fast reuse memory block may be added to the fast reuse memory block entry when the fixed reference block is again selected as an active block within the fast reuse threshold section.

Figure 20:
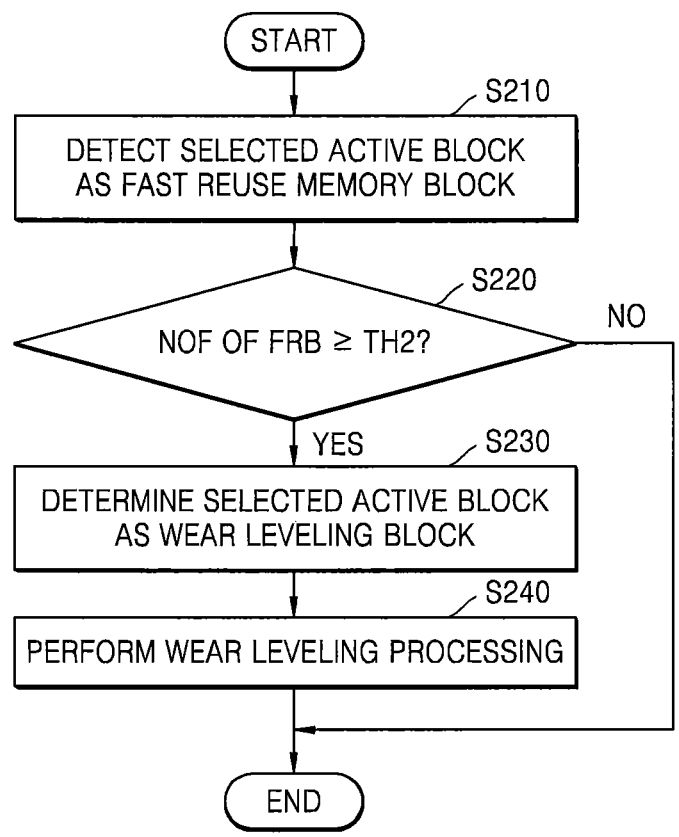
FIG. 20 is a flowchart of a memory block management method according to some embodiments of the inventive concepts.

FIG. 20 is a flowchart of a memory block management method according to some embodiments of the inventive concepts. For example, the flowchart of FIG. 20 may be performed by the memory system of FIG. 1 or 2. Memory controllers of various storage devices may include the memory system. For example, the flowchart of FIG. 20 may be performed by the FRB detection module 21 and the MB management module 22 of the memory controller 120A or 120B.

Referring to FIG. 20, in operation S210, the FRB detection module 21 may detect a selected active block as the fast reuse memory block. For example, it may be possible to detect the fast reuse memory block based on the flowcharts described with reference to FIGS. 16 to 19.

If the selected active block is detected as the fast reuse memory block, in operation S220, the MB management module 22 may determine whether the fast reuse count NOF of the detected fast reuse memory block FRB is greater than or equal to the second threshold value TH2. For example, the second threshold value TH2 may be set to an initial value in a product design process in consideration of a decrease in performance due to the fast reuse count NOF of a memory block.

If the determination result of operation S220 indicates that the fast reuse count NOF of the fast reuse memory block FRB is greater than or equal to the second threshold value TH2, in operation S230, the MB management module 22 may determine the selected active block as a wear leveling block.

In operation S240, the MB management module 22 may perform wear leveling processing on the active block determined as the wear leveling block. For example, the wear leveling processing may include an operation of copying data of a memory block, of which an update count is less than the reference value, from among memory blocks in the data block list to the memory block determined as the wear leveling block. Here, the memory blocks in the data block list, that is, memory blocks, each of which does not include a programmable page, mean memory blocks in each of which valid data is stored in at least one page.

The above-described wear leveling processing may prevent the performance of the memory system from decreasing due to the fast reuse by managing the fast reuse count of a memory block.

Figure 21:
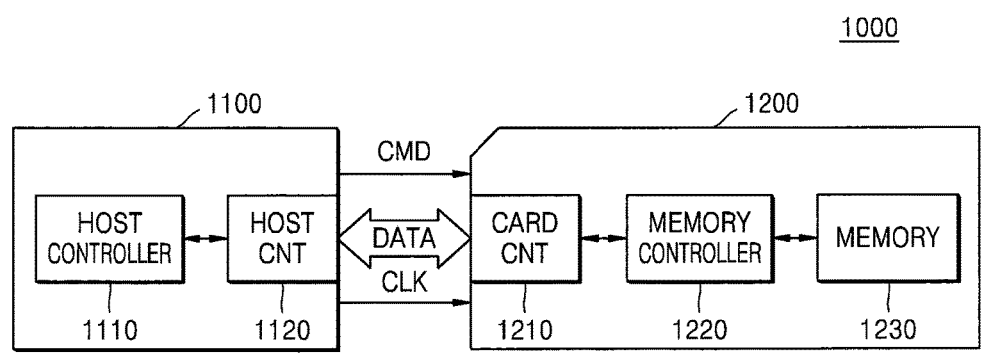
FIG. 21 is a schematic block diagram illustrating a memory card system including a memory system according to some embodiments of the inventive concepts.

FIG. 21 is a schematic block diagram illustrating a memory card system including a memory system according to some embodiments of the inventive concepts.

Referring to FIG. 21, a memory card system 1000 may include a host 1100 and a memory card 1200. The host 1100 may include a host controller 1110 and a host connector 1120. The memory card 1200 may include a card connector 1210, a card controller 1220, and a memory device 1230. The memory controller 120A or 120B and the memory device 110 illustrated in FIG. 1 or 2 may be respectively applied to the memory controller 1220 and the memory device 1230.

The host 1100 may write data in the memory card 1200 or read data stored in the memory card 1200. The host controller 1110 may transmit a command, a clock signal CLK generated by a clock generator (not illustrated) in the host 1100, and data to the memory card 1200 through the host connector 1120.

The card controller 1220 may store data in the memory device 1230 in response to a command received through the card connector 1210, and in particular, the data may be stored in the memory device 1230 in synchronization with a clock signal generated by a clock generator (not illustrated) in the card controller 1220. The memory device 1230 may store data provided from the host 1100.

The memory card 1230 may be implemented with a compact flash card (CFC), a microdrive, a smart media card (SMC), a multimedia card (MMC), a security digital card (SDC), a memory stick, a universal serial bus (USB) flash memory driver, etc.

Figure 22:
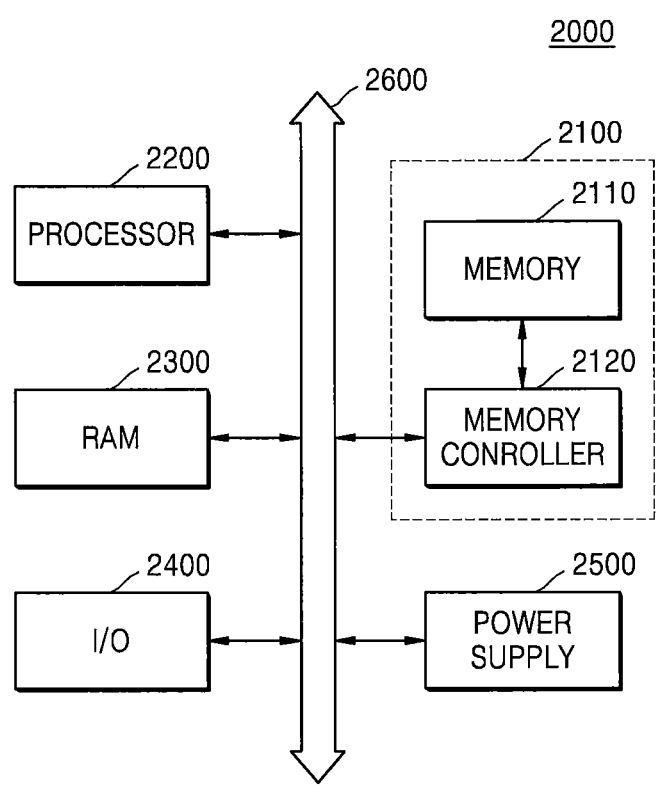
FIG. 22 is a schematic block diagram illustrating a computing system including a memory system according to some embodiments of the inventive concepts.

FIG. 22 is a schematic block diagram illustrating a computing system including a memory system according to some embodiments of the inventive concepts.

Referring to FIG. 22, a computing system 2000 may include a memory system 2100, a processor 2200, RAM 2300, an input/output (I/O) device 2400, and a power supply 2500.

The memory system 2100 may include a memory device 2110 and a memory controller 2120. The memory device 110 and the memory controller 120A or 120B illustrated in FIG. 1 or 2 may be respectively applied to the memory device 2110 and the memory controller 2120.

The computing system 2000 may further include ports that communicate with a video card, a sound card, a memory card, a USB device, etc. or that communicate with other electronic devices. The computing system 2000 may be implemented with a personal computer (PC) or may be implemented with a portable electronic device such as a notebook computer, a cellular phone (or a smart phone), a personal digital assistant (PDA), a camera, etc.

The processor 2200 may perform specific calculations or tasks. According to some embodiments, the processor 2200 may be a microprocessor or a CPU. The processor 2200 may communicate with the RAM 2300, the input/output device 2400, and the memory system 2100 through a bus 2600 including, but is not limited to, an address bus, a control bus, and a data bus. According to some embodiments, the processor 2200 may be also connected to an expansion bus such as a peripheral component interconnect (PCI) bus.

The RAM 2300 may store data for operations of the computing system 2000. For example, the RAM 2300 may be implemented with dynamic RAM (DRAM), mobile DRAM, static RAM (SRAM), phase change RAM (PRAM), ferroelectric RAM (FRAM), resistive RAM (RRAM), and/or magnetoresistive RAM (MRAM).

The I/O device 2400 may include input devices such as a keyboard, a mouse, a microphone, a touch pad, and a touch screen and output devices such as a printer and a display. The power supply 2500 may supply an operating voltage for operations of the computing system 2000.

Figure 23:
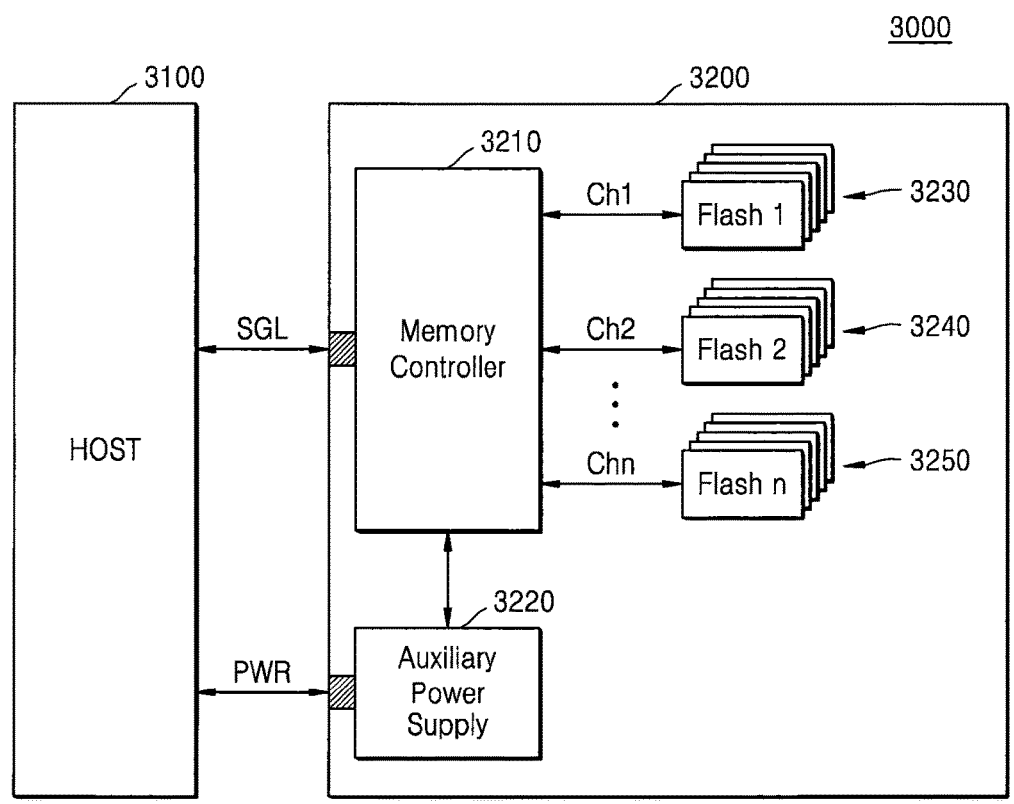
FIG. 23 is a schematic block diagram illustrating a solid state drive including a memory system according to some embodiments of the inventive concepts.

FIG. 23 is a schematic block diagram illustrating a solid state drive including a memory system according to some embodiments of the inventive concepts.

Referring to FIG. 23, a solid state drive (SSD) system 3000 may include a host 3100 and an SSD 3200. The SSD 3200 may exchange a signal with the host 3100 through a signal connector and may receive electric power through a power connector. The SSD 3200 may include an SSD controller 3210, an auxiliary power supply 3220, and a plurality of memory devices 3230, 3240, and 3250. The memory controller 120A or 120B and the memory device 110 illustrated in FIG. 1 or 2 may be respectively applied to the memory controller 3210 and the memory devices 3230 to 3250.

While the inventive concepts have been particularly shown and described with reference to embodiments thereof, it will be understood that various changes in form and details may be made therein without departing from the spirit and scope of the following claims.

What is claimed is:

1. A method of detecting a fast reuse memory block, the method comprising:
 selecting a memory block from memory blocks included in a nonvolatile memory device as a reference block at an initially set period;
 managing one of an erase time and a program time of the reference block, wherein the one of the erase time and the program time of the reference block is one of a calculated difference in time between a first time that the reference block is erased and a second time that the reference block is erased and a calculated difference in time between a first time that the reference block is programmed and a second time that the reference block is programmed; and
 determining, based on a use period that is determined according to the managed one of the erase time and the program time of the reference block, whether other memory blocks are fast reuse memory blocks.

2. The method of claim 1, wherein the reference block is selected from memory blocks that are changed to active blocks from among memory blocks that were included in a free block list at the initially set period.

3. The method of claim 2, wherein the memory blocks in the free block list are changed to the active blocks based on an order in which the memory blocks were registered in the free block list as free blocks, and wherein the reference block is selected from the memory blocks that were changed to the active blocks at the initially set period.

4. The method of claim 1, wherein a plurality of reference blocks are selected for respective periods that are different from each other.

5. The method of claim 1, wherein the managing comprises:
 marking the managed one of the erase time and the program time of the reference block;
 calculating one of an erase cycle and a program cycle of the reference block based on the marked one of the erase time and the program time;
 determining that the calculated one of the erase cycle and the program cycle is less than or equal to an initially set threshold value; and
 determining the reference block as a fast reuse memory block based on the determination that the calculated one of the erase cycle and the program cycle of the reference block is less than or equal to the initially set threshold value.

6. The method of claim 5,
wherein the marked one of the erase time and the program time is a marked erase time,
wherein the calculated one of the erase cycle and the program cycle is a calculated erase cycle, and
wherein the calculating comprises:
  detecting a detected erase time when the reference block is erased after again being selected as an active block; and
  calculating the calculated erase cycle by computing a difference between the detected erase time and the marked erase time.

7. The method of claim 5, further comprising:
  fixing, based on the reference block being determined as a fast reuse memory block, the selected memory block as the reference block such that the reference block is not changed to a new memory block.

8. The method of claim 5, further comprising determining, based on the reference block being determined as a fast reuse memory block, a fast reuse count of the reference block by adding a value of "1" to a value that is obtained by dividing a time of a period, within which the reference block is selected, by an erase cycle time of the reference block.

9. The method of claim 5,
wherein the calculated one of the erase cycle and the program cycle is a calculated erase cycle, and
wherein the determining whether other memory blocks are fast reuse memory blocks comprises:
  determining, based on the calculated erase cycle of the reference block, whether memory blocks that are used as active blocks during an erase interval of the reference block are fast reuse memory blocks.

10. The method of claim 1, wherein determining whether other memory blocks are fast reuse memory blocks comprises determining, based on the managed one of the erase time and the program time of the reference block, memory blocks that are used as active blocks during a section where the reference block is detected as a fast reuse memory block as fast reuse memory blocks.

11. The method of claim 1, further comprising:
  registering information in a fast reuse block table about memory blocks that are respectively determined as fast reuse memory blocks,
  wherein the fast reuse block table comprises respective information about at least a block address and a fast reuse count for the memory blocks that are respectively determined as fast reuse memory blocks.

12. A memory block management method, the method comprising:
  detecting fast reuse memory blocks, in each of which one of an erase cycle and a program cycle is less than or equal to an initially set first threshold value, from among a plurality of memory blocks included in a nonvolatile memory device;
  determining a memory block, of which a fast reuse count is greater than or equal to an initially set second threshold value, from among the detected fast reuse memory blocks as a wear leveling block; and
  performing wear leveling processing on the wear leveling block,
  wherein the detecting the fast reuse memory blocks comprises:
    selecting a memory block from the plurality of memory blocks in the nonvolatile memory device as a reference block at an initially set period;
    managing one of an erase time and a program time of the reference block, wherein the one of the erase time and the program time of the reference block is one of a calculated difference in time between a first time that the reference block is erased and a second time that the reference block is erased and a calculated difference in time between a first time that the reference block is programmed and a second time that the reference block is programmed; and
    determining, based on a use period that is determined according to the one of the erase time and the program time of the reference block, whether other memory blocks are fast reuse memory blocks.

13. The method of claim 12, wherein the determination of whether the other memory blocks are fast reuse memory blocks comprises:
  determining, based on the managed one of the erase time and the program time of the reference block, memory blocks that are used as active blocks during a section where the reference block is detected as a fast reuse memory block as fast reuse memory blocks.

14. The method of claim 12, wherein the performing the wear leveling processing on the wear leveling block comprises:
  selecting, from among memory blocks that are included in a data block list, a memory block having an update count that is less than a reference value; and
  copying data from the selected memory block to the memory block determined as the wear leveling block.

15. A memory block management method, the method comprising:
  selecting a memory block, from among memory blocks included in a nonvolatile memory device, as a reference block;
  increasing a fast reuse count of the selected reference block based on a determination that a use period of the selected reference block is less than a first threshold, the use period being a time between adjacent erase or program operations that are performed on the selected reference block;
  setting a fast reuse count that is equal to the increased fast reuse count of the selected reference block for active memory blocks that are used within the use period of the selected reference block; and
  performing wear leveling processing on one or more of the memory blocks based on a determination that a respective fast reuse count of the one or more of the memory blocks is greater than a second threshold,
  wherein the performing the wear leveling processing comprises copying data to the one or more of the memory blocks comprising the fast reuse counts that are greater than the second threshold from one or more respective memory blocks that have an update count that is less than a third threshold.

16. The memory block management method of claim 15, wherein the selecting the memory block as a reference block comprises selecting a memory block that is erased based on a change of the memory block from a free block to an active block.

17. The memory block management method of claim 16, wherein the selecting the memory block as a reference block is based on a determination that a previously selected reference block has not been reused within a predetermined period of time.

18. The memory block management method of claim 15, wherein the use period of the selected reference block is a time between adjacent erase operations that are performed on the reference block.

19. The method of claim 1, wherein the determining whether other memory blocks are fast reuse memory blocks comprises:
- determining that the reference block is a fast reuse memory block based on the one of the erase time and the program time being less than or equal to an initially set threshold value;
- registering the reference block in a fast reuse block table; and
- registering the other memory blocks in the fast reuse block table with a fast reuse count that is equal to a fast reuse count of the reference block.

* * * * *